US010645283B2

(12) United States Patent
    Seo

(10) Patent No.: US 10,645,283 B2
(45) Date of Patent: May 5, 2020

(54) DISPLAY DEVICE

(71) Applicant: LG ELECTRONICS INC., Seoul (KR)

(72) Inventor: Kwanhee Seo, Seoul (KR)

(73) Assignee: LG ELECTRONICS INC., Seoul (KR)

(\*) Notice: Subject to any disclaimer, the term of this patent is extended or adjusted under 35 U.S.C. 154(b) by 152 days.

(21) Appl. No.: 15/695,771

(22) Filed: Sep. 5, 2017

(65) Prior Publication Data

US 2018/0070011 A1    Mar. 8, 2018

(30) Foreign Application Priority Data

Sep. 6, 2016 (KR) .................. 10-2016-0114328

(51) Int. Cl.
*H04N 5/232*     (2006.01)
*H04N 13/189*    (2018.01)
*H04N 5/445*     (2011.01)
*H04N 21/422*    (2011.01)
*H04N 5/44*      (2011.01)
(Continued)

(52) U.S. Cl.
CPC ..... *H04N 5/23238* (2013.01); *G06F 3/04815* (2013.01); *H04N 5/4403* (2013.01); *H04N 5/44513* (2013.01); *H04N 7/002* (2013.01); *H04N 13/189* (2018.05); *H04N 21/42204* (2013.01); *G06F 2203/04806* (2013.01); *G09G 5/003* (2013.01); *G09G 2320/0606* (2013.01); *G09G 2320/08* (2013.01); *G09G 2340/045* (2013.01); *G09G 2340/0442* (2013.01); *G09G 2354/00* (2013.01); *H04N 5/2628* (2013.01)

(58) Field of Classification Search
None
See application file for complete search history.

(56) References Cited

U.S. PATENT DOCUMENTS 9,218,792 B2    12/2015 Dutta et al.
2005/0243209 A1\*    11/2005 Iwahashi .............. H04N 5/4403
                                                         348/556
(Continued)

FOREIGN PATENT DOCUMENTS

EP    2704094 A1    3/2014
JP    3498001 B2    2/2004
(Continued)

*Primary Examiner* — Christopher J Kohlman
(74) *Attorney, Agent, or Firm* — Birch, Stewart, Kolasch & Birch, LLP

(57) ABSTRACT

A display device including a display configured to display at least a portion of an omnidirectional image; a user input interface configured to input a display mode of the omnidirectional image to be one of a first display mode and a second display mode; and a controller configured to in response to the input display mode being the first display mode, set a size of an area of the omnidirectional image to be displayed on the display to correspond with an aspect ratio of the display, in response to the input display mode being the second display mode, set the size of the area of the omnidirectional image to be displayed on the display to correspond with an aspect ratio that is different than the aspect ratio of the display, and display a first partial image on the display including an area having the set size of the omnidirectional image.

19 Claims, 24 Drawing Sheets

(51) Int. Cl.
  *G06F 3/0481* (2013.01)
  *H04N 7/00* (2011.01)
  G09G 5/00 (2006.01)
  H04N 5/262 (2006.01)

(56) References Cited

U.S. PATENT DOCUMENTS

| | | | |
|---|---|---|---|
| 2008/0036907 A1* | 2/2008 | Umei | H04N 19/44 |
| | | | 348/445 |
| 2008/0084503 A1* | 4/2008 | Kondo | G09G 5/005 |
| | | | 348/556 |
| 2014/0063181 A1 | 3/2014 | Lee et al. | |
| 2014/0176542 A1* | 6/2014 | Shohara | G06T 15/205 |
| | | | 345/420 |
| 2015/0091939 A1 | 4/2015 | Suzuki et al. | |
| 2015/0302551 A1* | 10/2015 | Huang | G06T 3/0012 |
| | | | 382/199 |
| 2016/0132991 A1* | 5/2016 | Fukushi | A63F 13/5255 |
| | | | 345/667 |
| 2016/0302661 A1 | 10/2016 | Huang et al. | |
| 2017/0013231 A1* | 1/2017 | Kwon | H04N 7/0122 |

FOREIGN PATENT DOCUMENTS

| | | |
|---|---|---|
| KR | 10-2003-0037131 A | 5/2003 |
| KR | 10-2010-0067635 A | 6/2010 |

* cited by examiner

DISPLAY DEVICE

CROSS-REFERENCE TO A RELATED APPLICATION

This application claims priority under 35 U.S.C. 119 and 365 to Korean Patent Application No. 10-2016-0114328, filed on Sep. 6, 2016 in the Korean Intellectual Property Office, the disclosure of which is incorporated herein by reference.

BACKGROUND OF THE INVENTION

1. Field of the Invention

The present invention relates to a display device for providing a display mode for displaying omnidirectional video content in various manners.

2. Description of the Related Art

Recently, technology for omnidirectionally capturing an image using an omnidirectional camera and then providing the image to a user has been developed. Representative examples of the technology include a capture device called a 360-degree camera and a terminal or a display device for displaying an image captured using the 360-degree camera.

If an omnidirectionally captured image is displayed on one screen, severe distortion may occur. Accordingly, the omnidirectionally captured image is generally displayed by displaying an image of a partial area corresponding to a specific view of the omnidirectionally captured image and then displaying an image of another partial area according to user manipulation.

If the image of the partial area of the omnidirectionally captured image is displayed, since the size of the display area is set according to an aspect ratio, a specific object (subject) included in the image may not be included in the screen. That is, a portion of the object may not be displayed at the edge of the screen. In this instance, the user should inconveniently shift the area in order to view the remaining portion of the object.

In addition, if an omnidirectionally captured image is viewed through a display device such as a TV, since the TV has a larger screen than that of a mobile terminal, it is possible to provide a more efficient viewing environment. However, since the TV is fixed, shift of the view of the omnidirectionally captured image is more inconvenient as compared to the mobile terminal. Therefore, the user can experience inconvenience in viewing of the omnidirectionally captured image. Accordingly, there is a need for a method of more conveniently viewing the omnidirectionally captured image through such a fixed display device.

SUMMARY OF THE INVENTION

An object of the present invention is to provide a display device capable of displaying an omnidirectional image using various methods based on setting of a display mode.

A display device according to an embodiment of the present invention includes a display unit configured to display at least a portion of an omnidirectional image, a user input interface configured to receive input of setting a display mode of the omnidirectional image, and a controller configured to set the display mode based on the received input, to set a size of an area of the omnidirectional image to be displayed through the display unit based on the set display mode, and to display a first partial image including an area having the set size of the omnidirectional image.

A display device according to an embodiment of the present invention includes a display unit configured to display a first partial image including an area corresponding to a first view of an omnidirectional image and a controller configured to set a display mode of the omnidirectional image based on a set aspect ratio of the display device, to set a size of an area corresponding to a first view of the omnidirectional image based on the set display mode, and to display the first partial image including an area having the set size.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
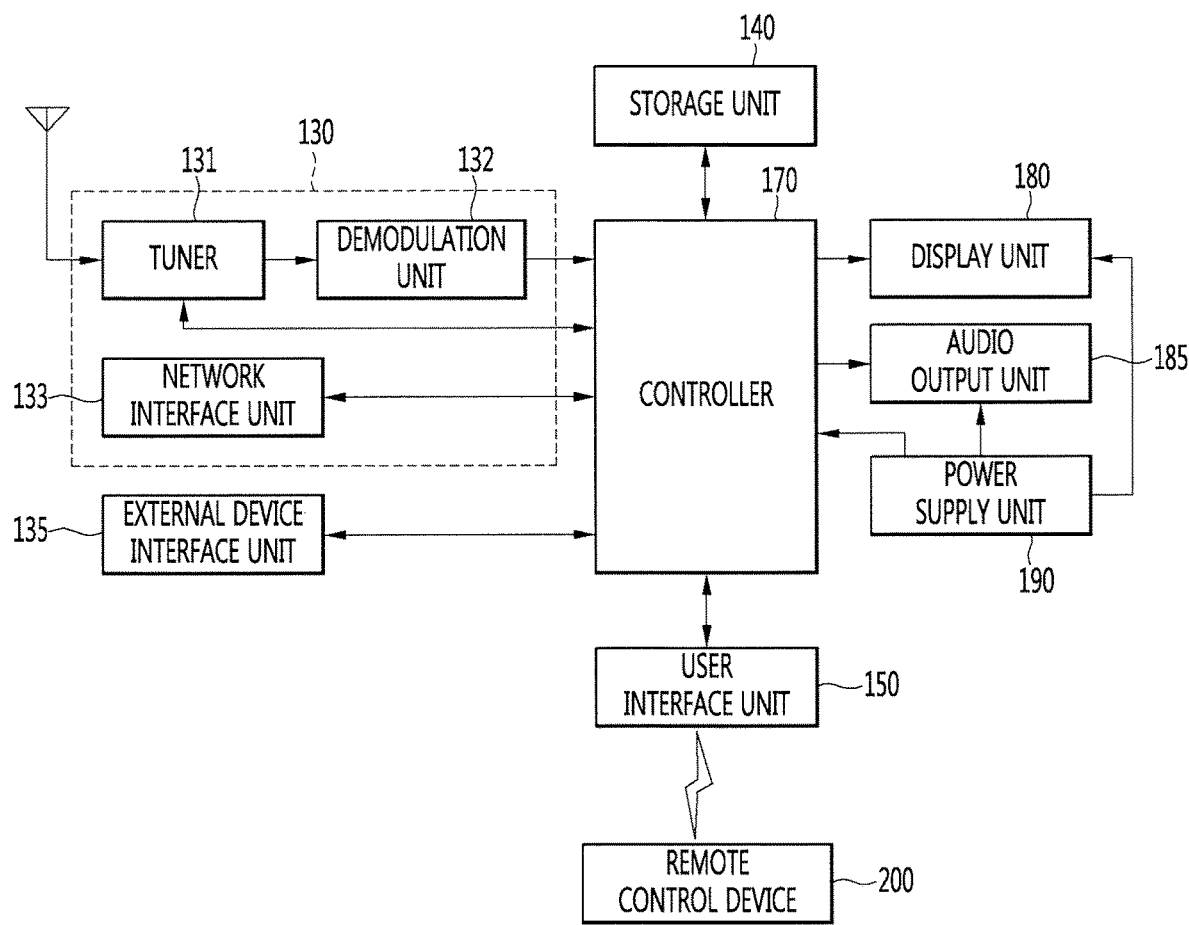
FIG. 1 is a block diagram of a configuration of a display device according to an embodiment of the present invention.

FIG. 1 is a block diagram illustrating a configuration of a display device according to an embodiment of the present invention. Referring to FIG. 1, a display device 100 can include a broadcast reception unit 130, an external device interface unit 135, a storage unit 140, a user input interface unit 150, a controller 170, a wireless communication unit 173, a display unit 180, an audio output unit 185, and a power supply unit 190.

The broadcast reception unit 130 can include a tuner 131, a demodulation unit 132, and a network interface unit 133. The tuner 131 can select a specific broadcast channel according to a channel selection command. The tuner 131 can receive broadcast signals for the selected specific broadcast channel. The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the controller 170 or the storage unit 140. The external device interface 135 can provide a connection path between the display device 100 and an external device. The external device interface 135 can receive at least one of image and audio output from an external device that is wirelessly or wiredly connected to the display device 100 and deliver it to the controller. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185. An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network. Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network. Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator. The network interface unit 133 can select and receive a desired application among applications open to the air, through network.

The storage unit 140 can store signal-processed image, voice, or data signals stored by a program in order for each signal processing and control in the controller 170. Additionally, the storage unit 140 can perform a function for temporarily store image, voice, or data signals output from the external device interface unit 135 or the network interface unit 133 and can store information on a predetermined image through a channel memory function. The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user. The user input interface unit 150 can deliver signals input from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (UWB), ZigBee, Radio Frequency (RF), and IR.

Additionally, the user input interface unit 150 can deliver, to the controller 170, control signals input from local keys such as a power key, a channel key, a volume key, and a setting key. Image signals that are image-processed in the controller 170 can be input to the display unit 180 and displayed as an image corresponding to corresponding image signals. Additionally, image signals that are image-processed in the controller 170 can be input to an external output device through the external device interface unit 135.

Voice signals processed in the controller 170 can be output to the audio output unit 185. Additionally, voice signals processed in the controller 170 can be input to an external output device through the external device interface unit 135. Besides that, the controller 170 can control overall operations in the display device 100.

Additionally, the controller 170 can control the display device 100 by a user command or internal program input through the user input interface unit 150 and download a desired application or application list into the display device 100 in access to network. The controller 170 can output channel information selected by a user together with processed image or voice signals through the display unit 180 or the audio output unit 185.

Additionally, according to an external device image playback command received through the user input interface unit 150, the controller 170 can output image signals or voice signals of an external device such as a camera or a camcorder, which are input through the external device interface unit 135, through the display unit 180 or the audio output unit 185. Moreover, the controller 170 can control the display unit 180 to display images and control broadcast images input through the tuner 131, external input images input through the external device interface unit 135, images input through the network interface unit, or images stored in the storage unit 140 to be displayed on the display unit 180. In this instance, an image displayed on the display unit 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The display unit 180 can convert image signals, data signals, or OSD signals, which are processed in the controller 170, or images signals or data signals, which are received in the external device interface unit 135, into R, G, and B signals to generate driving signals. Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132. For example, the display device 100 can be divided into an image processing device such as a set-top box for receiving broadcast signals or contents according to various network services and a content playback device for playing contents input from the image processing device.

In this instance, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
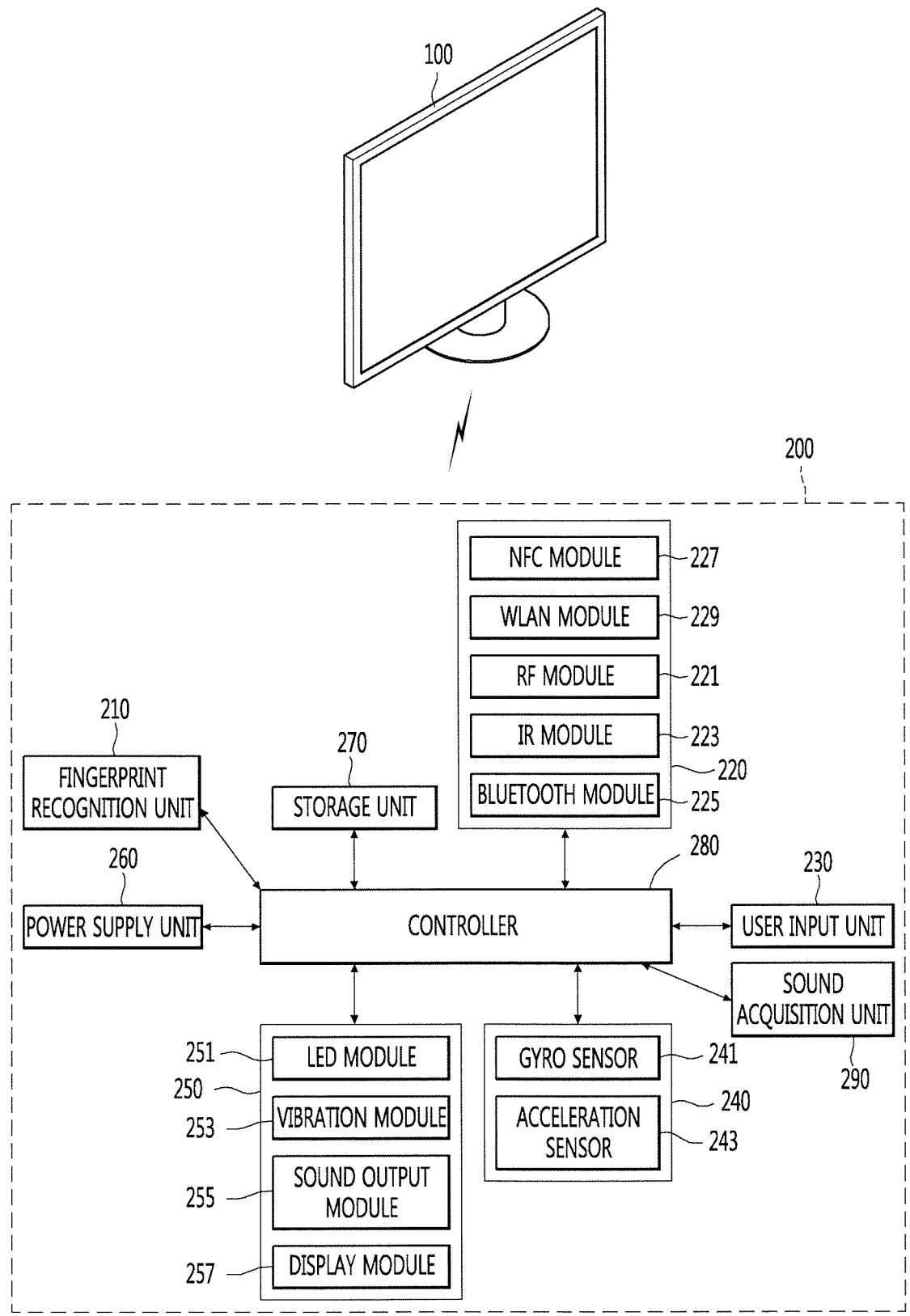
FIG. 2 is a block diagram of a remote control device according to an embodiment of the present invention.
Figure 3:
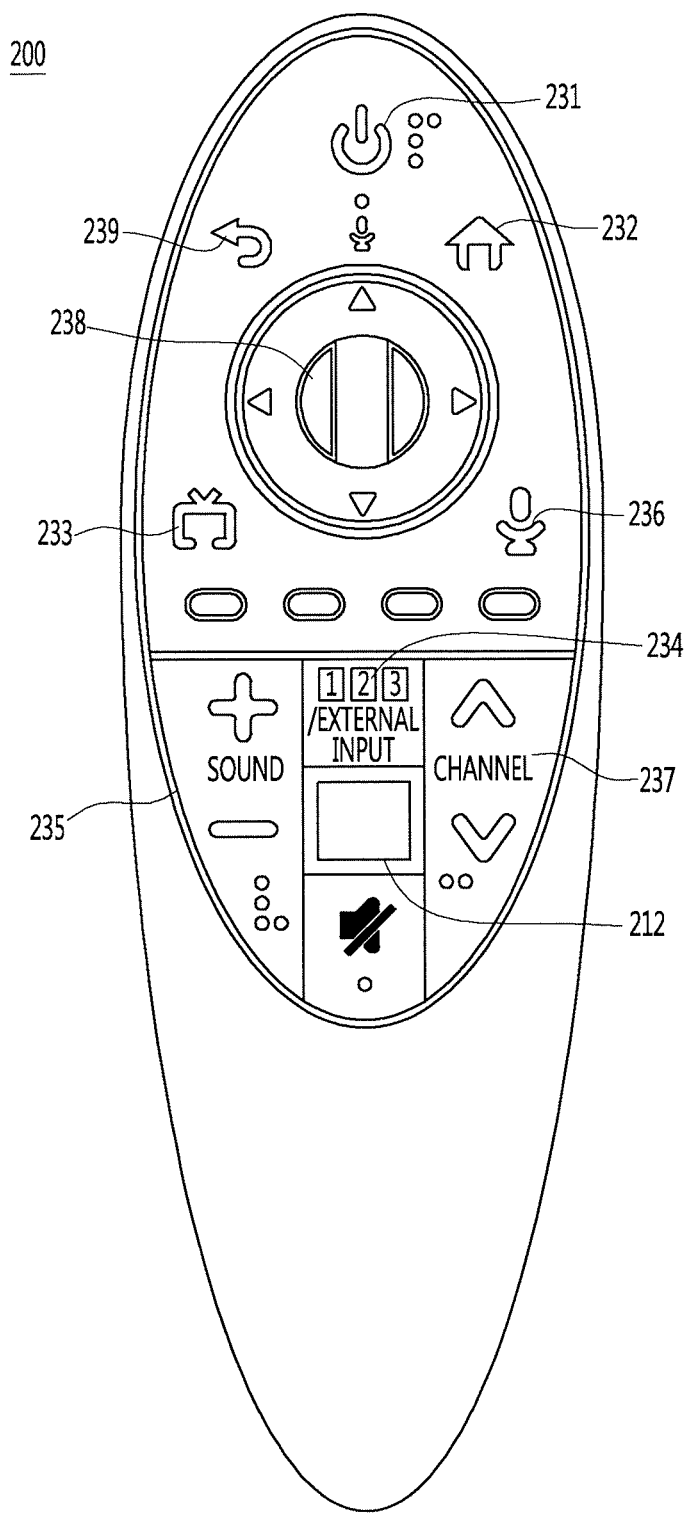
FIG. 3 is a diagram illustrating an actual configuration example of a remote control device according to an embodiment of the present invention.

Then, referring to FIGS. 2 and 3, a remote control device is described according to an embodiment of the present invention. In particular, FIG. 2 is a block diagram illustrating a remote control device according to an embodiment of the present invention, and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290. Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220. Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described. If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200. For example, the gyro sensor 241 can sense information on an operation of the remote control device 200 based on x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250. For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage unit 270, information on a frequency band for transmitting/receiving signals to/from the display device 100 paired with the remote control device 200 and refer to it. The controller 280 controls general matters relating to a control of the remote control device 200. The controller 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice. The voice acquisition unit 290 can include at least one microphone 291 and obtain voice through the microphone 291.

Figure 4:
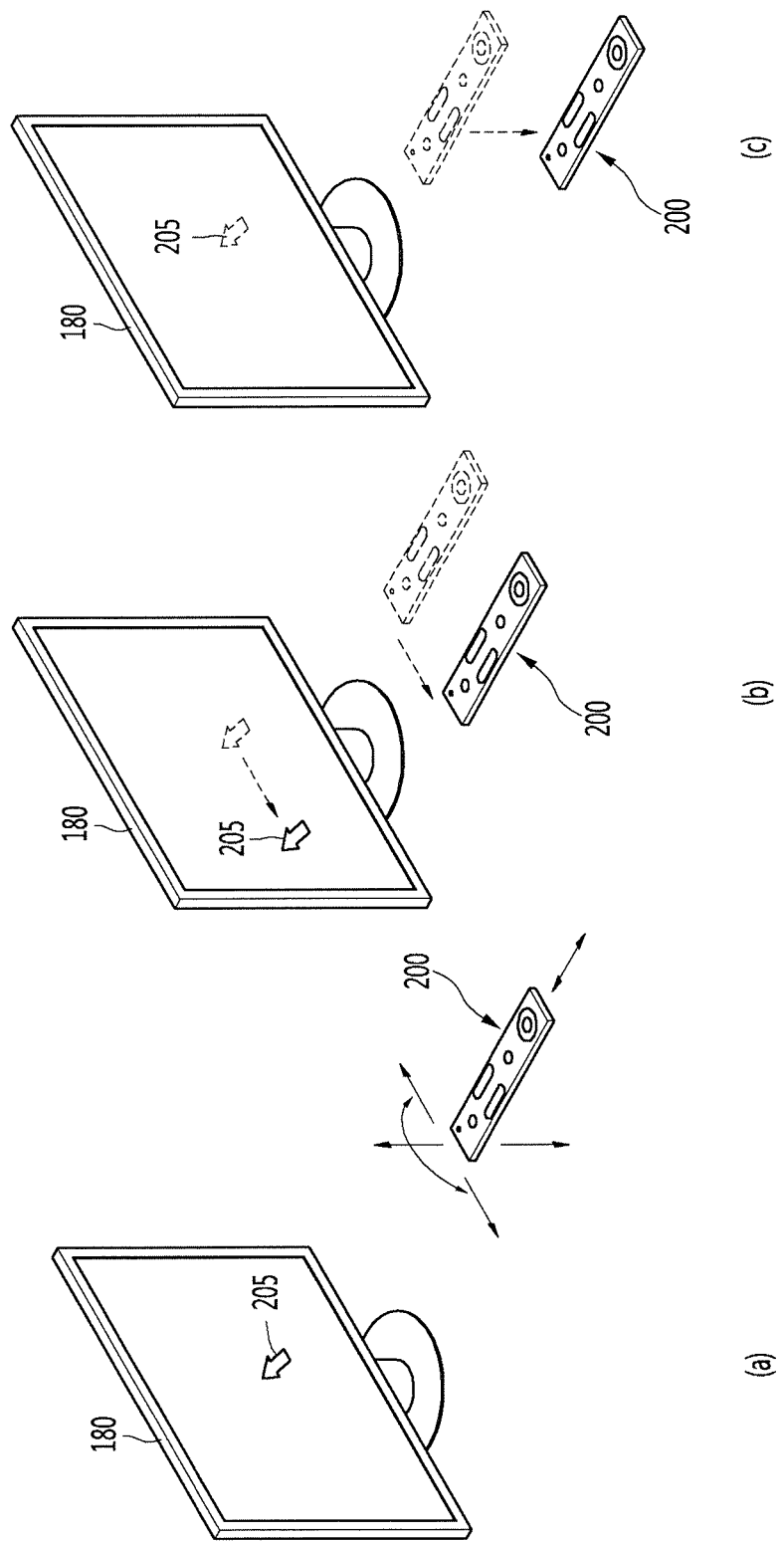
FIG. 4 is a diagram illustrating an example in which a remote control device is used according to an embodiment of the present invention.

Next, FIG. 4 is described. In particular, FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(*b*) illustrates that if a user moves the remote control device 200, the pointer 205 displayed on the display unit 180 of the display device 100 is moved to the left in correspondence thereto. Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed largely. Further, if a user moves the remote control device 200 close to the display unit 180, a selection area in the display unit 180 corresponding to the pointer 205 can be zoomed out and displayed reduced.

In addition, if the remote control device 200 is away from the display unit 180, a selection area can be zoomed out and if the remote control device 200 is close to the display unit 180, a selection area can be zoomed in. Additionally, if a specific button in the remote control device 200 is pressed, the recognition of a vertical or horizontal movement can be excluded.

That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200. Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
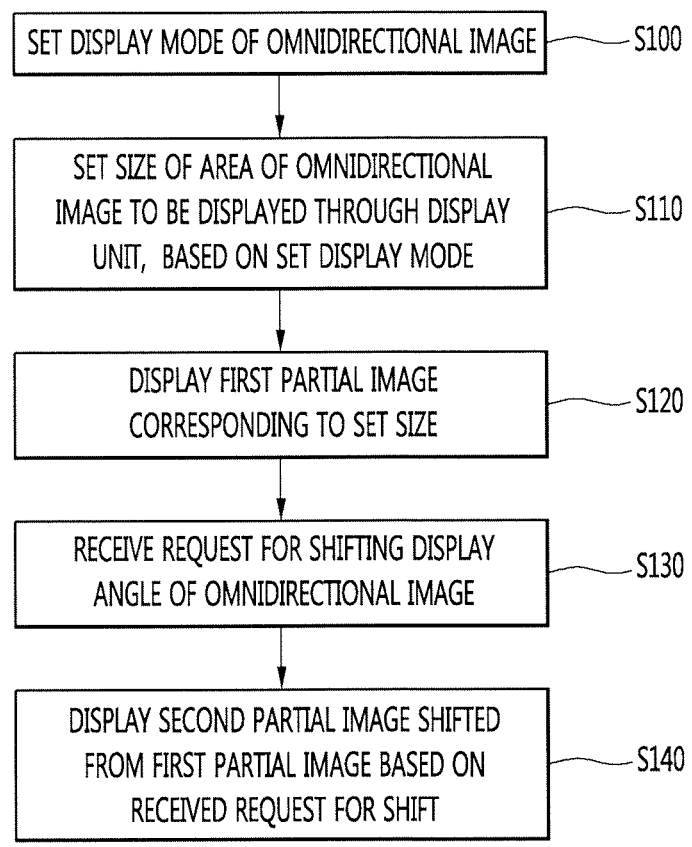
FIG. 5 is a flowchart illustrating an omnidirectional image display method of a display device according to an embodiment of the present invention.

Hereinafter, an omnidirectional image display method of a display device according to an embodiment of the present invention will be described. In particular, FIG. 5 is a flowchart illustrating an omnidirectional image display method of a display device according to an embodiment of the present invention. An omnidirectional image is captured using an omnidirectional camera (for example, a 360-degree camera) and means an image obtained by capturing an entire spherical area of the camera.

Referring to FIG. 5, the display device 100 can set a display mode of an omnidirectional image (S100). The size of a partial image of the omnidirectional image to be displayed through the display unit 180 is set according to the display mode. The display mode may include a first mode (or normal mode) for displaying a partial image having a size corresponding to an aspect ratio of the display unit 180 and a second mode for displaying a partial image having a size which does not correspond to the aspect ratio of the display unit 180.

For example, the second mode may include a horizontal display mode and a vertical display mode. The horizontal display mode displays a partial image having a width greater than that of a partial image of the first mode and the vertical display mode displays a partial image having a height greater than that of the partial image of the first image.

In some embodiments, the display mode may be set according to an aspect ratio set through an aspect ratio setting function of the display device 100. For example, if the set aspect ratio is equal to the aspect ratio of the display unit 180, the display mode of the omnidirectional image may be set to the first mode. In contrast, if the width of the set aspect ratio is greater than that of the aspect ratio of the display unit 180, the display mode of the omnidirectional image may be set to the horizontal display mode. In addition, if the height of the set aspect ratio is greater than that of the aspect ratio of the display unit 180, the display mode of the omnidirectional image may be set to the vertical display mode. That is, according to the embodiment, the horizontal display mode and the vertical display mode may be subdivided according to the value of the set aspect ratio.

The controller 170 of the display device 100 can receive an input of setting the display mode of the omnidirectional image through the remote control device 200 and set the display mode based on the received input. The display device 100 can set the size of the partial image of the omnidirectional image to be displayed through the display unit 180 based on the set display mode (S110).

The controller 170 can set the size of the partial image to be displayed to a size corresponding to the aspect ratio of the display unit 180 if the set display mode is the first mode. For example, if the aspect ratio of the display unit 180 is 16:9, the size of the partial image can be set to 16:9.

If the set display mode is the second mode, the controller 170 can set the size of the partial image to be displayed differently from the size of the partial image in the first mode. For example, the width set in the horizontal display mode may be greater than the width set in the first mode (e.g., 21:9). In addition, the height set in the vertical display mode may be greater than the height set in the first mode (e.g., 4:3).

The display device 100 can display a first partial image corresponding to the set size (S120). For example, the first partial image may be an image having an area corresponding to the front view of the omnidirectional image, without being limited thereto. The display device 100 can receive a request for shifting the display angle (or the display point) of the omnidirectional image (S130).

In addition, the controller 170 can display an indicator for receiving the request for shifting the display point through the display unit 180. The controller 170 can also receive a request for shifting the display point of the omnidirectional image in any one of the upper, lower, left and right directions based on the indicator. The indicator will be described in greater detail with reference to FIGS. 8A to 8C and 10A to 10C.

The display device 100 can display a second partial image shifted from the first partial image based on the received request for shift (S140). The second partial image may include a portion of an area corresponding to the first partial image or may not include the area corresponding to the first partial image. Steps S100 to S140 will be described in detail with reference to FIGS. 6A to 10C.

Figure 6A:
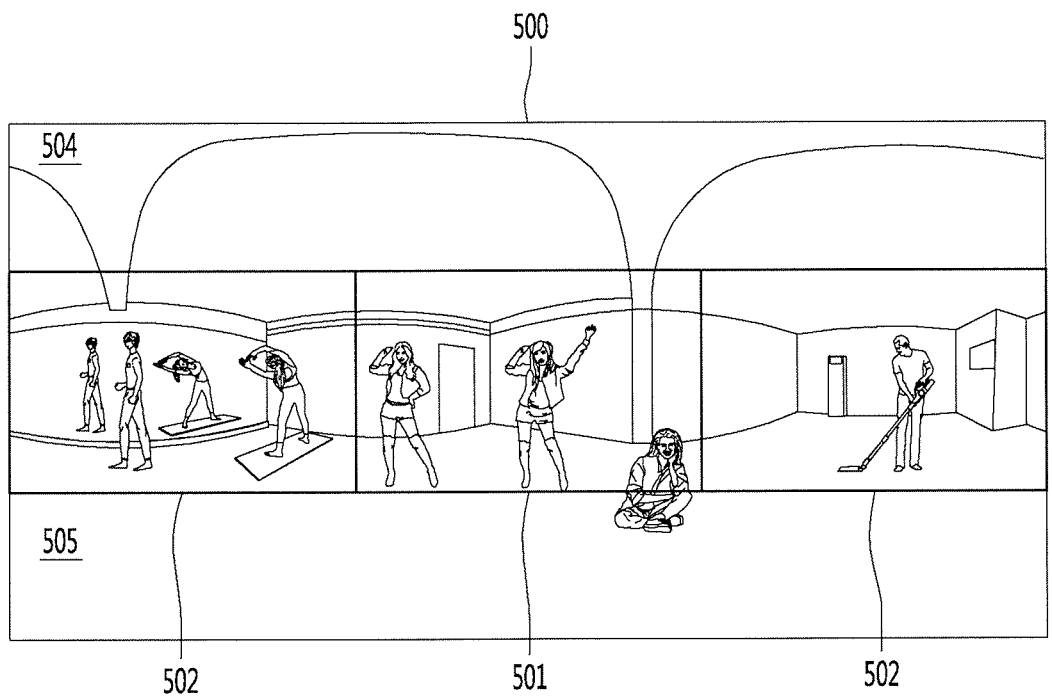
FIGS. 6A to 6C are diagrams showing a partial image of an omnidirectional image displayed through a display device.
Figure 6B:
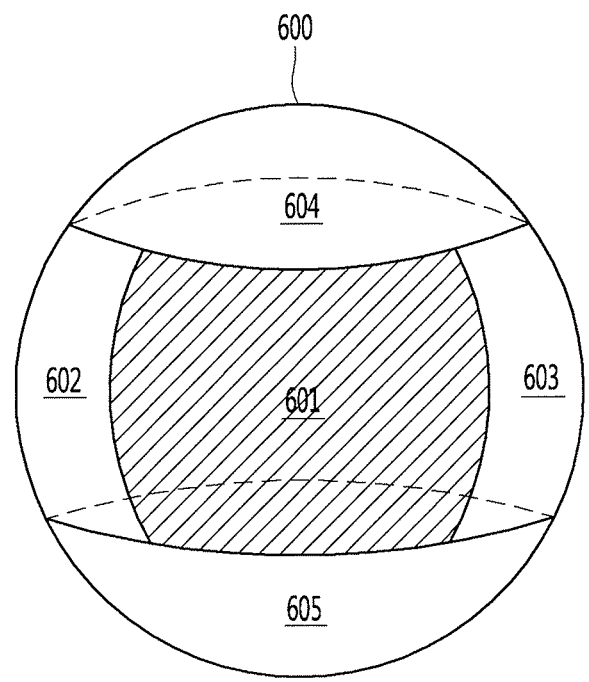
Figure 6C:
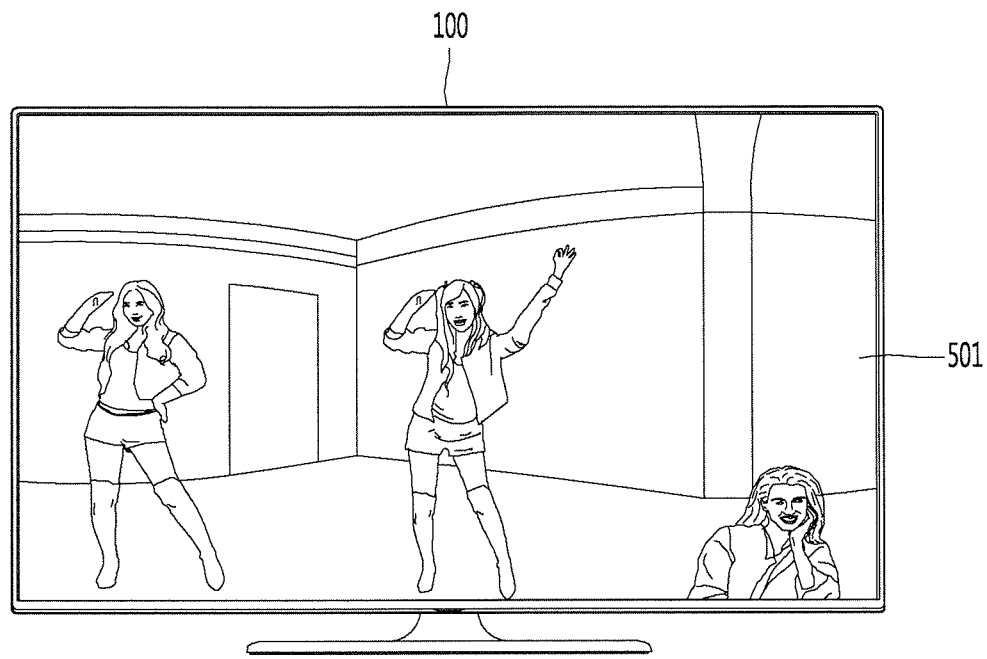

In particular, FIGS. 6A to 6C are diagrams showing a partial image of an omnidirectional image displayed through a display device. Referring to FIGS. 6A to 6C, the display device 100 can receive the omnidirectional image 500 generated by the omnidirectional camera. For convenience of description, although the omnidirectional image 500 is divided into a plurality of areas 501 to 505 in FIG. 6A, the omnidirectional image 500 is not necessarily divided into the plurality of areas 501 to 505.

The omnidirectional camera can capture a spherical area 600 and generate the omnidirectional image 500 based on the captured result. As shown in FIG. 6A, if the omnidirectional image 500 is displayed in a planar shape, the omnidirectional image 500 may be distorted. Accordingly, the display device 100 can display partial images including a portion of the omnidirectional image 500, thereby minimizing distortion.

As shown in FIG. 6C, the display device 100 can display a partial image 501 having a size corresponding to the aspect ratio of the display unit 180 through the display unit 180, if the display mode of the omnidirectional image is set to the first mode. If it is assumed that the aspect ratio of the display unit 180 is 16:9, the size of the partial image 501 may be set to 16:9. The controller 170 can acquire the partial image 501 having a reference view (or a reference location) of the omnidirectional image 500 and having a size of 16:9. The acquired partial image 501 may be a partial image corresponding to a first area 601 of the entire area 600. The reference view can be the front view of the omnidirectional image 500, without being limited thereto.

Hereinafter, in FIGS. 7A to 10C, a partial image displayed when the display mode of the omnidirectional image is a second mode (horizontal display mode or vertical display mode) will be described while being compared to the partial image 501 of FIG. 6C. In particular, FIGS. 7A to 7D are diagrams illustrating an embodiment of a partial image displayed through a display unit when the display mode of an omnidirectional image is set to a horizontal display mode.

Figure 7A:
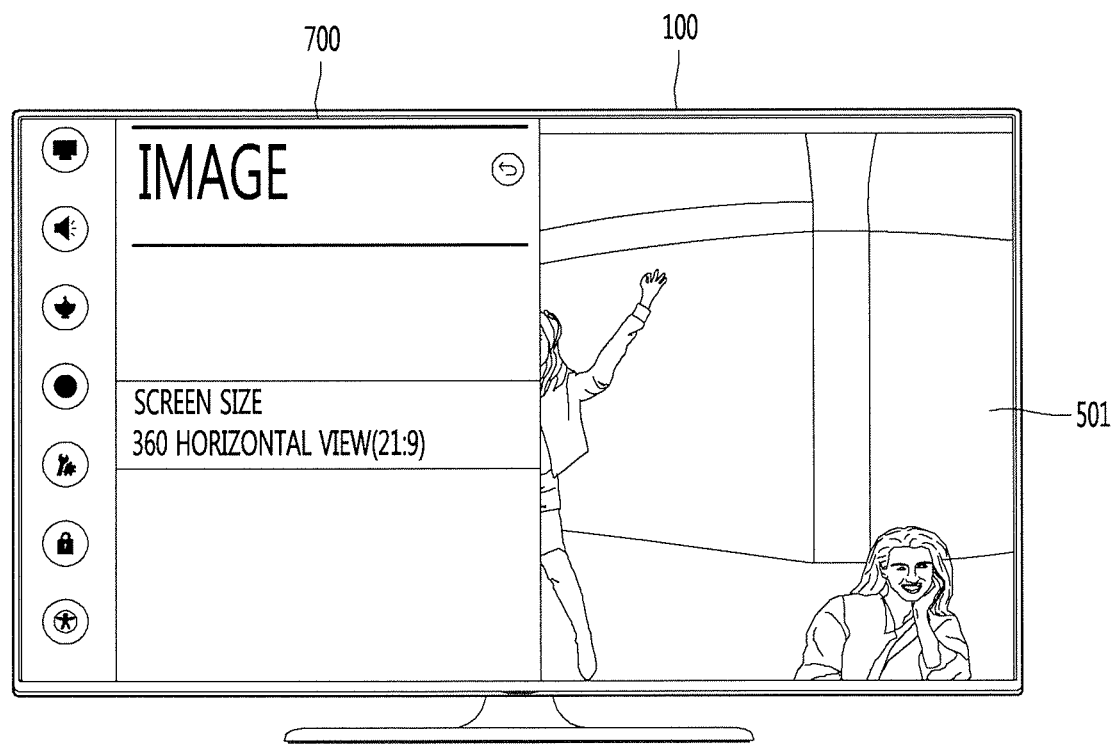
FIGS. 7A to 7D are diagrams illustrating an embodiment of a partial image displayed through a display unit when the display mode of an omnidirectional image is set to a horizontal display mode.

Referring to FIG. 7A, the controller 170 can display a setting window 700 for setting the display mode of the omnidirectional image through the display unit 180. The controller 170 can receive input of setting the display mode to the horizontal display mode through the user input interface unit 150 based on the displayed setting window 700. Based on the received input, the controller 170 can set the display mode of the omnidirectional image. That is, "360 horizontal view" displayed in the setting window 700 of FIG. 7A may mean the horizontal display mode.

In some embodiments, the controller 170 can set the display mode of the omnidirectional image using the aspect ratio setting menu of the display device 100. For example, if the aspect ratio of the display unit 180 is 16:9 and the aspect ratio set through the aspect ratio setting menu is 21:9, the display mode of the omnidirectional image may correspond to the horizontal display mode.

In a conventional aspect ratio setting, the controller 170 scales an image based on the set aspect ratio and displays the scaled image through the display unit 180. In this instance, the scaled image is not displayed on the entire area of the display unit 180. As described above, if the aspect ratio is set to 21:9, no image is displayed at the upper or lower sides of the display unit 180.

In contrast, in setting of the display mode of the omnidirectional image, the size of the partial image of the omnidirectional image 500 to be displayed in the entire area of the display unit 180 is set. Accordingly, the partial image can be displayed in the entire area of the display unit 180 regardless of the display mode.

Figure 7B:
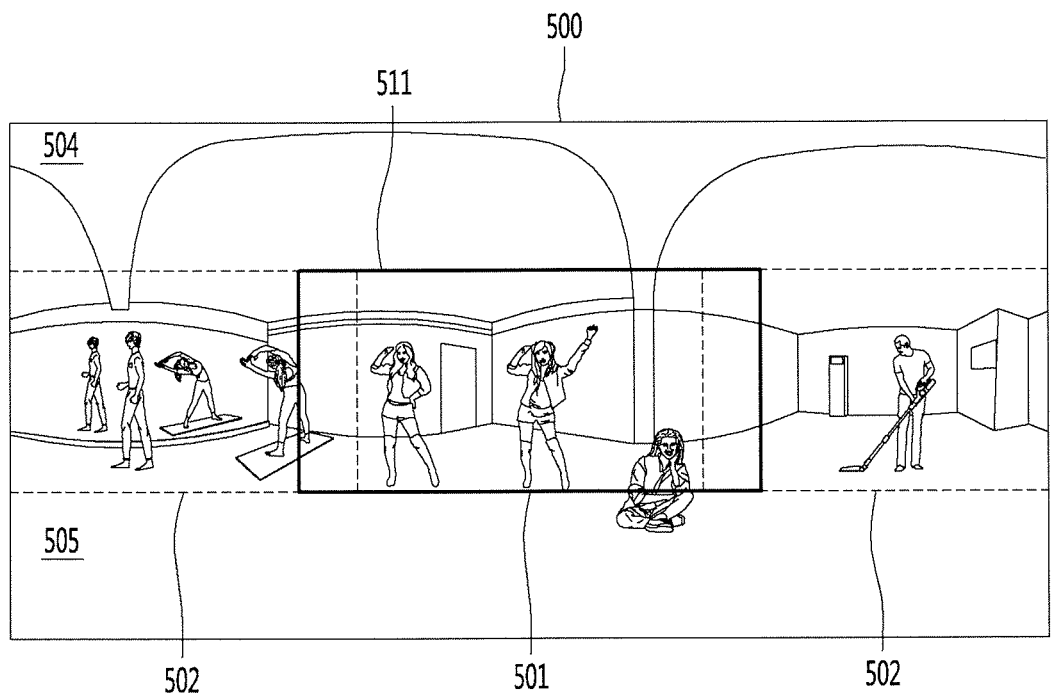
Figure 7C:
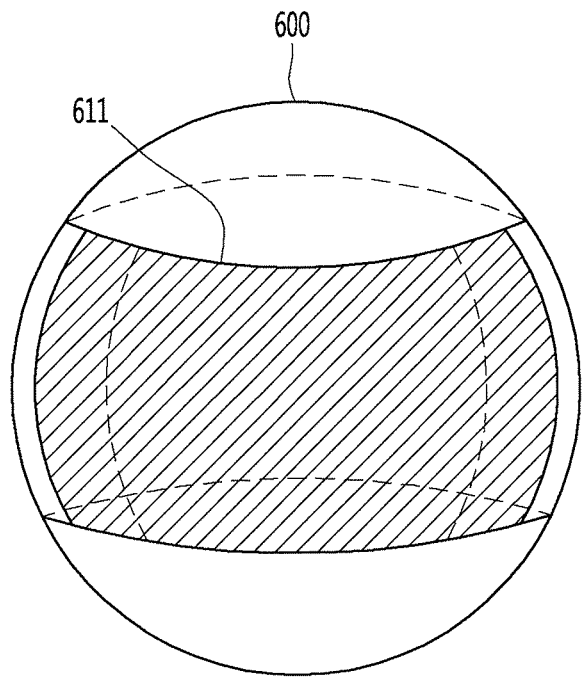

Referring to FIGS. 7B and 7C, the controller 170 can set the size of the partial image of the omnidirectional image 500 to be displayed through the display unit 180, based on the set display mode. If the display mode is a horizontal display mode, the controller 170 can set the width of the partial image to be greater than that of the partial image displayed in the first mode.

The controller 170 can acquire a partial image 511 of the omnidirectional image 500 to be displayed through the display unit 180 based on the set size. That is, as shown in FIGS. 7B and 7C, the controller 170 can acquire the partial image 511 including an area 611 greater than an area 601 of the partial image 501 of the first mode in the horizontal direction.

In some embodiments, if the display mode is set to the horizontal display mode by setting the aspect ratio of the display device 100 to 21:9, the size of the acquired partial image 511 may be 21:9. That is, the controller 170 can acquire the partial image 511 having a size corresponding to the set aspect ratio from the omnidirectional image 500.

Figure 7D:
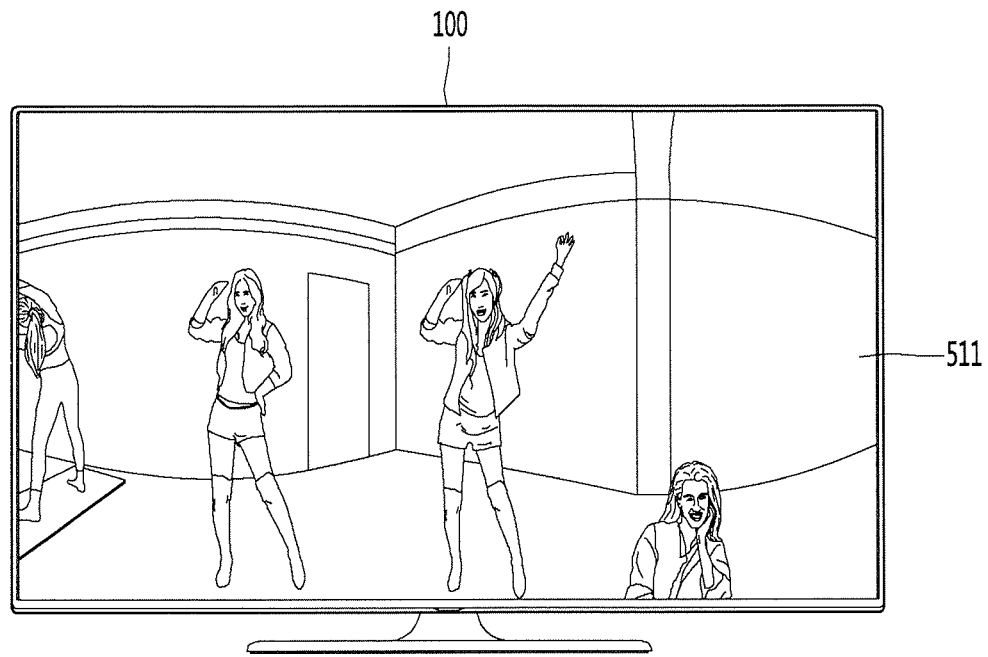

Referring to FIG. 7D, the controller 170 can display the acquired partial image 511 through the display unit 180. The partial image 511 may further include images located at the left and right sides of the partial image 501 shown in FIG. 6C. In addition, it can be seen that, in order to further display the images located at the left and right sides of the partial image 501, the width of the object included in the partial image 511 displayed through the display unit 180 is less than that of the object included in the partial image 501 of FIG. 6C.

That is, in the horizontal display mode, the display device 100 can display the partial image including the horizontal area greater than that of the first mode. For example, if portions of the object located at the left and right sides of the partial image of the first mode are not displayed, a user can change the display mode to the horizontal display mode to view the entire image of the object on one screen.

Figure 8A:
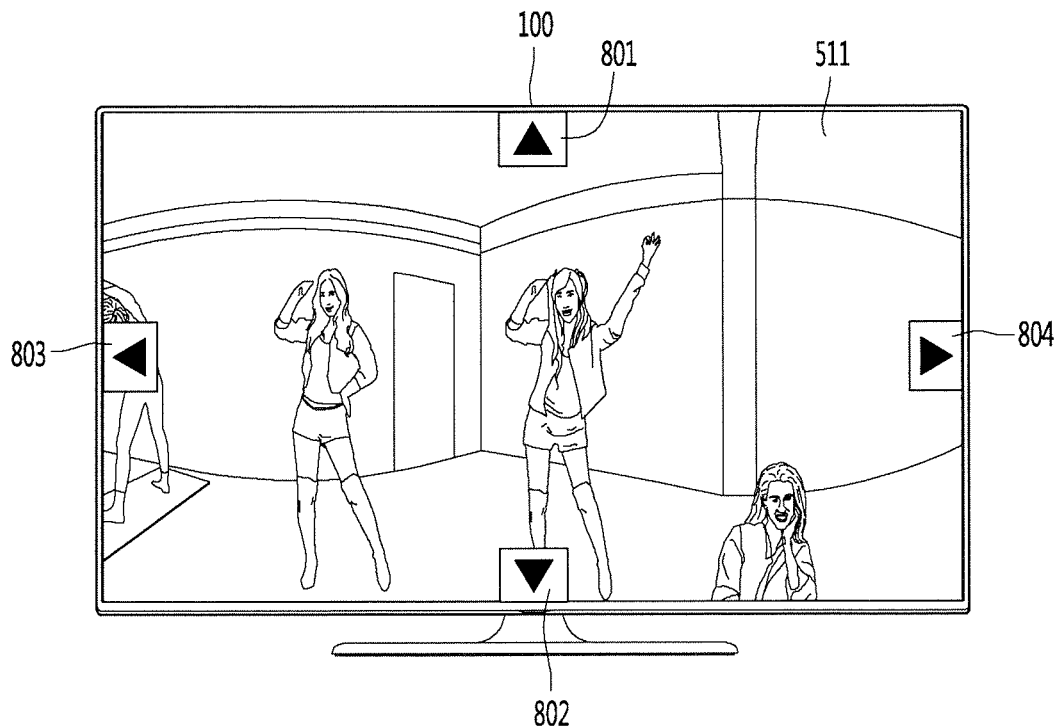
FIGS. 8A to 8C are diagrams showing examples of an indicator for shifting the area of the partial image of the omnidirectional image displayed through the display unit according to the embodiment of FIGS. 7A to 7D.
Figure 8B:
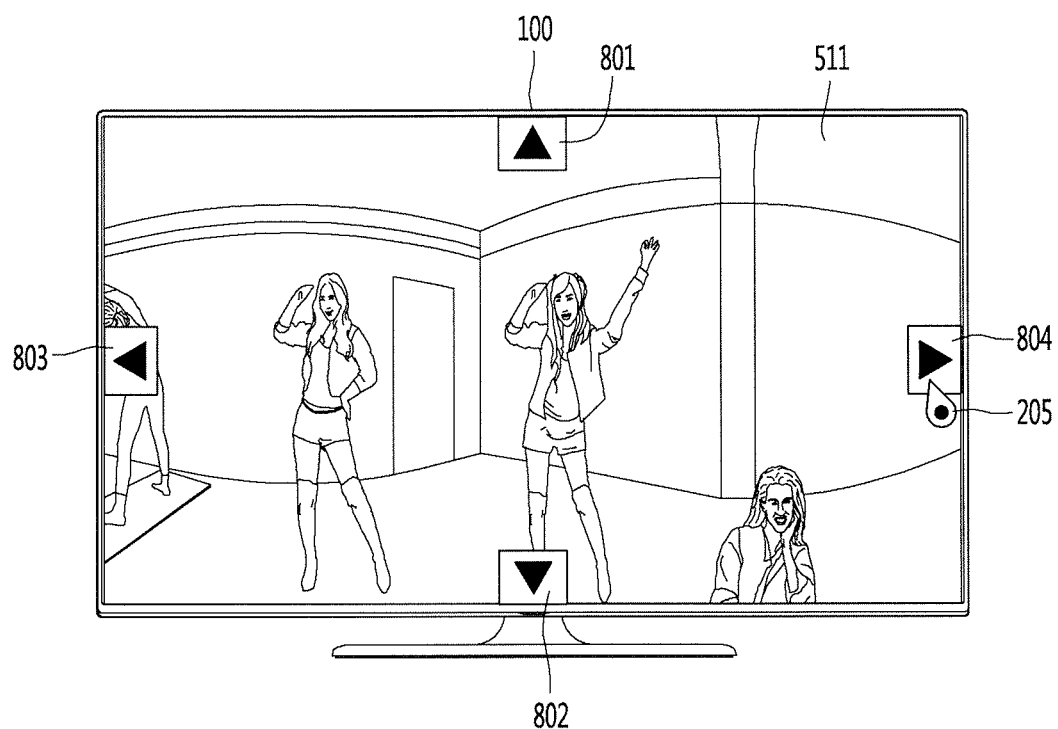
Figure 8C:
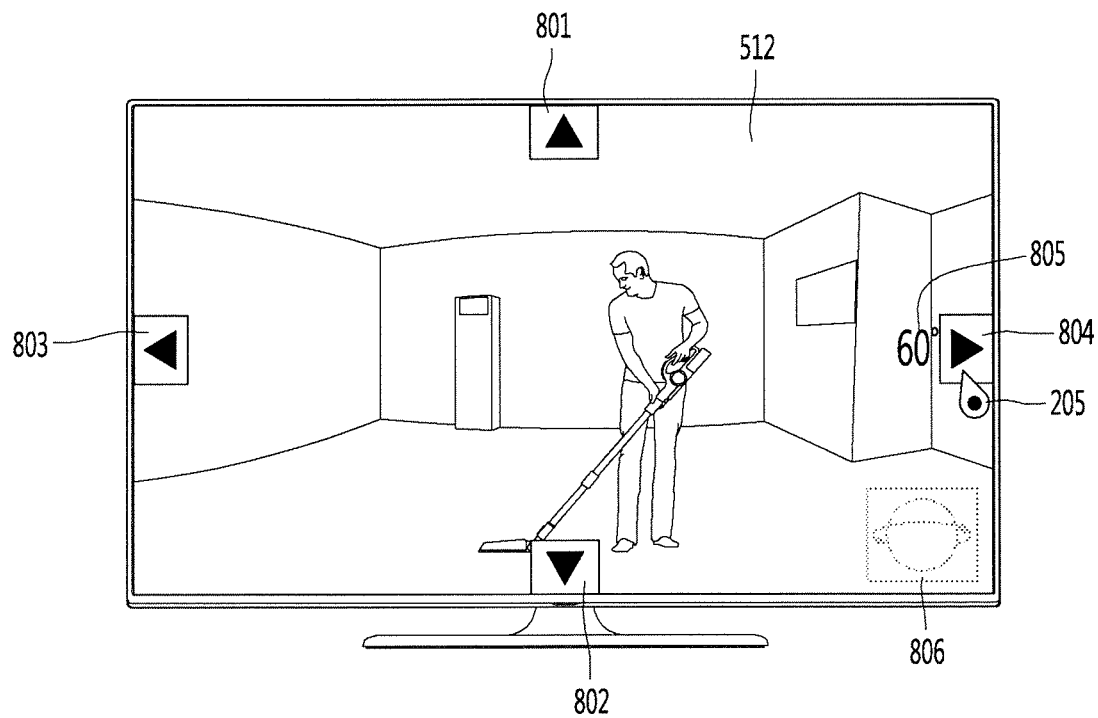

Next, FIGS. 8A to 8C are diagrams showing examples of an indicator for shifting the area of the partial image of the omnidirectional image displayed through the display unit according to the embodiment of FIGS. 7A to 7D. Referring to FIG. 8A, the controller 170 can display one or more indicators 801 to 804 for shifting the view of the area of the displayed partial image 511 of the omnidirectional image 500. For example, the controller 170 can display one or more indicators 801 and 802 for shifting the view in a vertical direction and one or more indicators 803 and 804 for shifting the view in a horizontal direction. Although one or more indicators 801 to 804 are shown as being arranged at the upper, lower, left and right sides of the display unit 180 in FIG. 8A, the present invention is not limited thereto. One or more indicators 801 to 804 may be selected by a pointer 205 displayed in correspondence with motion of the remote control device 200.

The indicator 801 provided at the upper side of the display unit 180 is used to shift the area of the omnidirectional image 500 displayed through the display unit 180 upward. That is, the controller 170 can display a partial image including an area shifted from the currently displayed partial image upward by a predetermined angle when the indicator 801 is selected. The indicator 802 provided at the lower side of the display unit 180 is used to shift the area of the omnidirectional image 500 displayed through the display unit 180 downward.

That is, the controller 170 can display a partial image including an area shifted from the currently displayed partial image downward by a predetermined angle when the indicator 802 is selected. The indicator 803 provided at the left side of the display unit 180 is used to shift the area of the omnidirectional image displayed through the display unit 180 to the left side. That is, the controller 170 can display a partial image including an area shifted from the currently displayed partial image to the left side by a predetermined angle when the indicator 803 is selected.

The indicator 804 provided at the right side of the display unit 180 is used to shift the area of the omnidirectional image displayed through the display unit 180 to the right side. That is, the controller 170 can display a partial image including an area shifted from the currently displayed partial image to the right side by a predetermined angle when the indicator 804 is selected.

Referring to FIGS. 8B and 8C, a user can select the indicator 804 using the remote control device 200, upon desiring to view the image of the right area of the currently displayed partial image 511 of the omnidirectional image 500. In this instance, the controller 170 can display a partial image 512 corresponding to a view shifted from the view of the currently displayed partial image 511 to the right side by a predetermined angle (e.g., 60°) through the display unit. According to the angle, the partial image 512 may or may not include a portion of the partial image 511 of FIG. 8A. The angle may be changed according to the set display mode, which will be described below.

The controller 170 can display an angle indicator 805 indicating an angle between a reference view of the omnidirectional image 500 and the view of the currently displayed partial image 512. As shown in FIG. 8C, the angle indicator 805 may be displayed adjacent to the indicator 804 corresponding to the direction in which the view is shifted from the reference view. That is, the user can intuitively confirm that the view of the currently displayed partial image 512 is shifted from the reference view to the right by 60° based on the indicator 804.

In some embodiments, the controller 170 can display a spherical indicator 806 indicating the location of the view of the currently displayed partial image 512 of the omnidirectional image 500. In addition, the controller 170 can further display a reference view indicator for immediate shift to a reference view. For example, when the view of the partial image is shifted away from the reference view by selecting the indicators 801 to 804 several times, the user can inconveniently select the indicators 801 to 804 several times in order to view the partial image of the reference view again. Accordingly, the controller 170 can display the reference view indicator for immediate shift to the reference view and display a partial image including the area of the reference view when the displayed reference view indicator is selected.

Figure 9A:
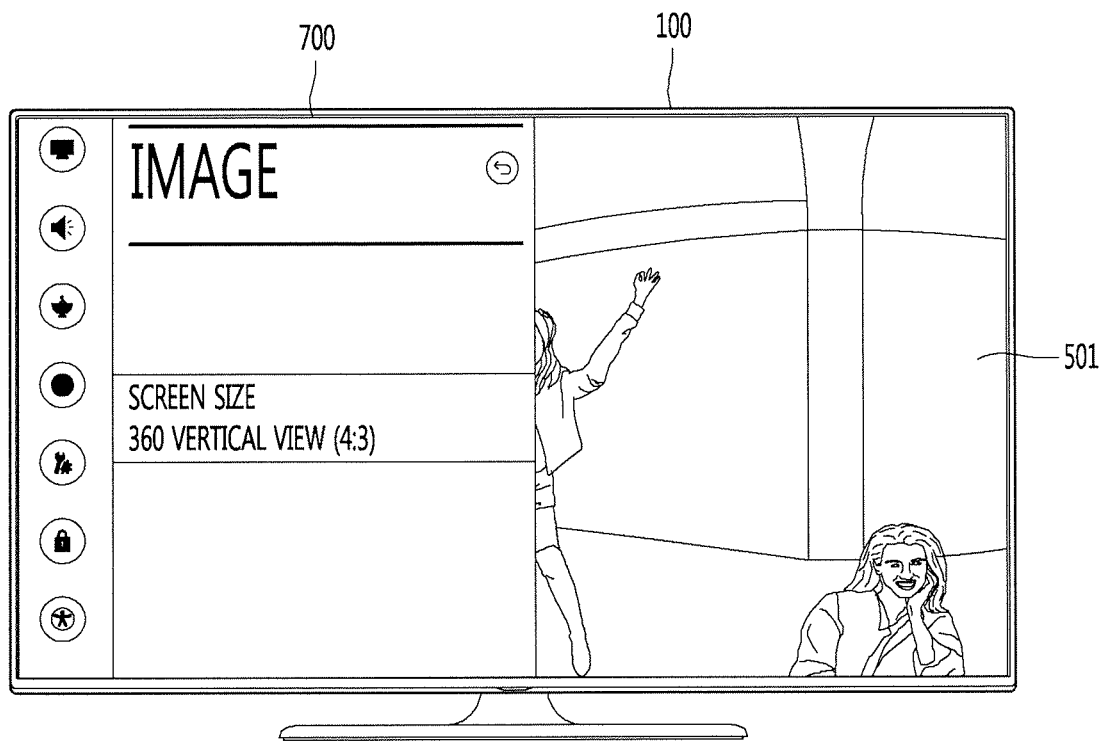
FIGS. 9A to 9D are diagrams illustrating an embodiment of a partial image displayed through a display unit when the display mode of an omnidirectional image is set to a vertical display mode.

Next, FIGS. 9A to 9D are diagrams illustrating an embodiment of a partial image displayed through a display unit when the display mode of an omnidirectional image is set to a vertical display mode. Referring to FIG. 9A, the controller 170 can receive input of setting the display mode to a vertical display mode through the user input interface 150, based on the displayed setting window 700. Based on the received input, the controller 170 can set the display mode of the omnidirectional image. That is, "360 vertical view" displayed in the setting window 700 of FIG. 9A may mean a vertical display mode.

In some embodiments, the controller 170 can set the display mode of the omnidirectional image using the aspect ratio setting menu of the display device 100. For example, if the aspect ratio of the display unit 180 is 16:9 and the aspect ratio set through the aspect ratio setting menu is 4:3, the display mode of the omnidirectional image may correspond to the vertical display mode.

In conventional aspect ratio setting, the controller 170 scales an image based on the set aspect ratio and displays the scaled image through the display unit 180. In this instance, the scaled image may not be displayed in the entire area of the display unit 180. As described above, if the aspect ratio is set to 4:3, no image is displayed at the left and right sides of the display unit 180.

In contrast, in setting of the display mode of the omnidirectional image, the size of the partial image of the omnidirectional image 500 to be displayed in the entire area of the display unit 180 is set. Accordingly, the partial image can be displayed in the entire area of the display unit 180 regardless of the display mode.

Figure 9B:
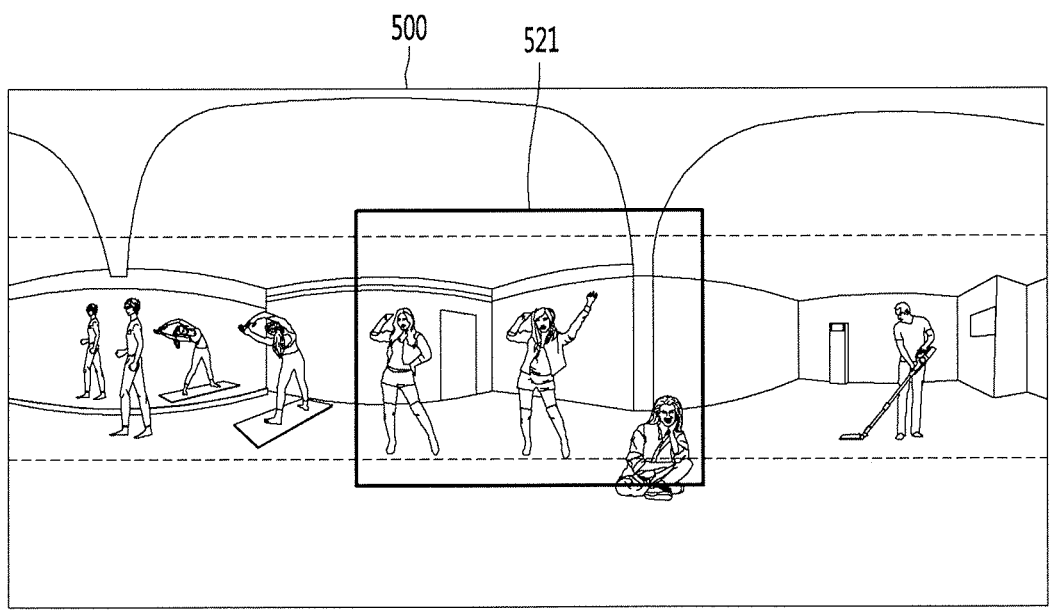
Figure 9C:
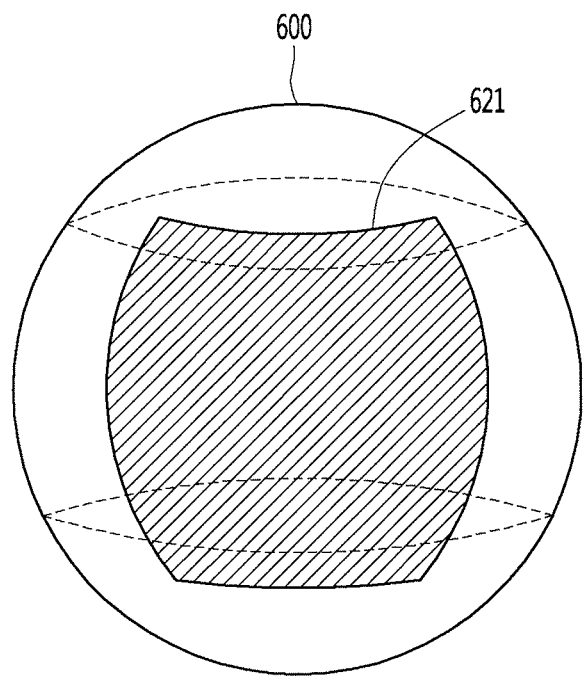

Referring to FIGS. 9B and 9C, the controller 170 can set the size of the partial image of the omnidirectional image 500 to be displayed through the display unit 180, based on the set display mode. If the display mode is a vertical display mode, the controller 170 can set the height of the partial image to be greater than that of the partial image in the first mode.

The controller 170 can acquire a partial image 521 of the omnidirectional image 500 to be displayed through the display unit 180 based on the set size. That is, as shown in FIGS. 9B and 9C, the controller 170 can acquire the partial image 521 including an area 621 greater than an area 601 of the partial image 501 of the first mode in the vertical direction.

In some embodiments, if the display mode is set to the vertical display mode by setting the aspect ratio of the display device 100 to 4:3, the size of the acquired partial image 511 may be 4:3. That is, the controller 170 can acquire the partial image 521 having a size corresponding to the set aspect ratio from the omnidirectional image 500.

Figure 9D:
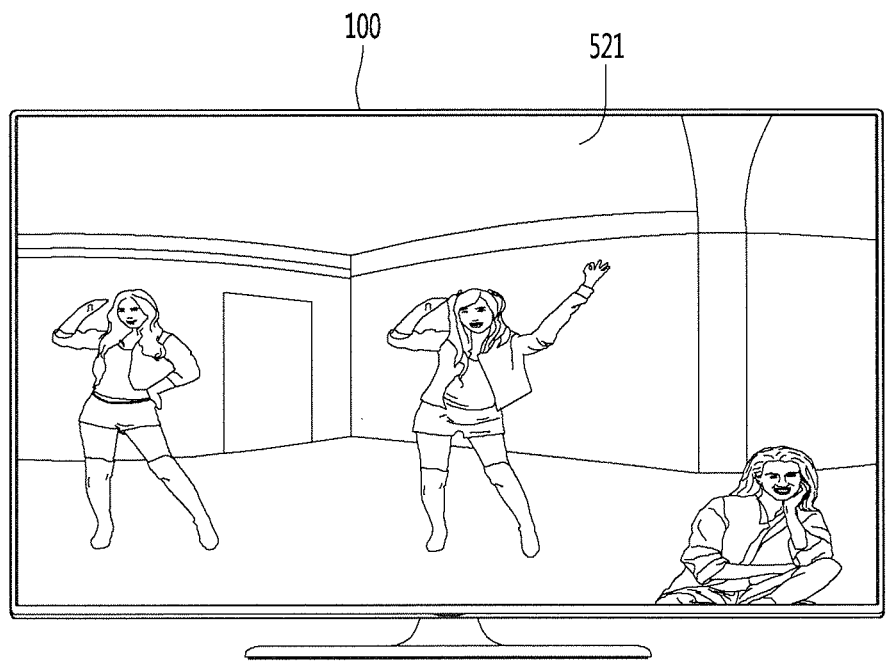

Referring to FIG. 9D, the controller 170 can display the acquired partial image 521 through the display unit 180. The partial image 521 may further include images located at the upper and lower sides of the partial image 501 shown in FIG. 6C. In addition, it can be seen that, in order to further display the images of the upper and lower sides of the partial image 501, the height of the object included in the partial image 521 displayed through the display unit 180 is less than that of the object included in the partial image 501 of FIG. 6C.

That is, in the vertical display mode, the display device 100 can display the partial image including the vertical area greater than that of the first mode. For example, if portions of the object located at the upper and lower sides of the partial image of the first mode are not displayed, a user can change the display mode to the vertical display mode to view the entire image of the object on one screen.

Figure 10A:
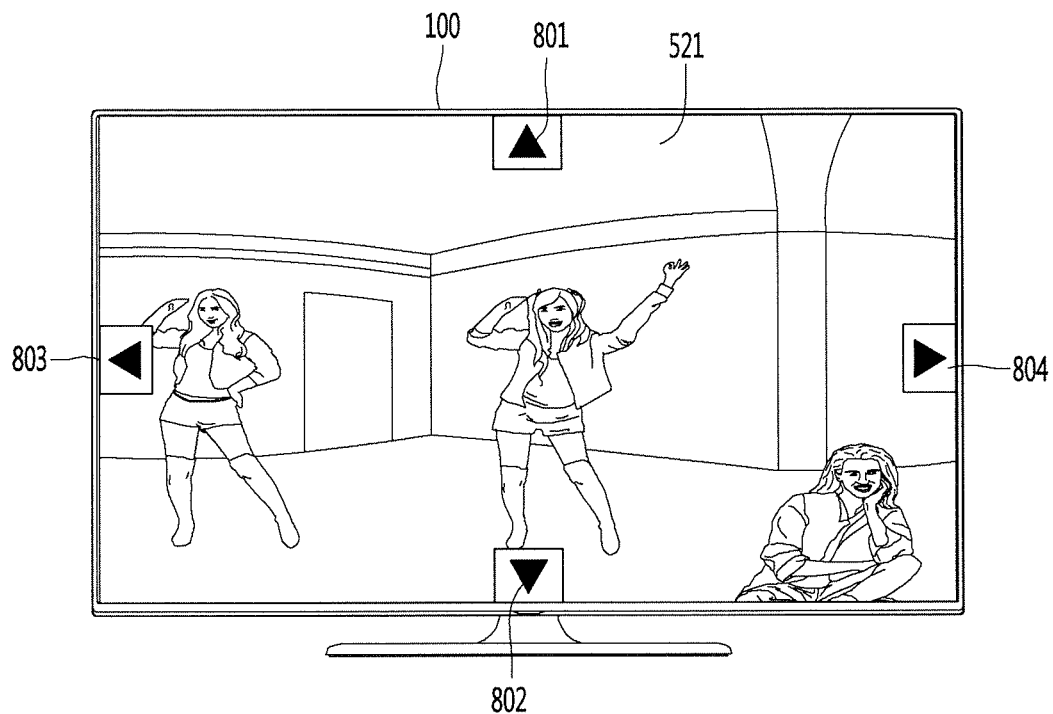
FIGS. 10A to 10C are diagrams showing an example of an indicator for shifting the area of the partial image displayed according to the embodiment of FIGS. 9A to 9D.
Figure 10B:
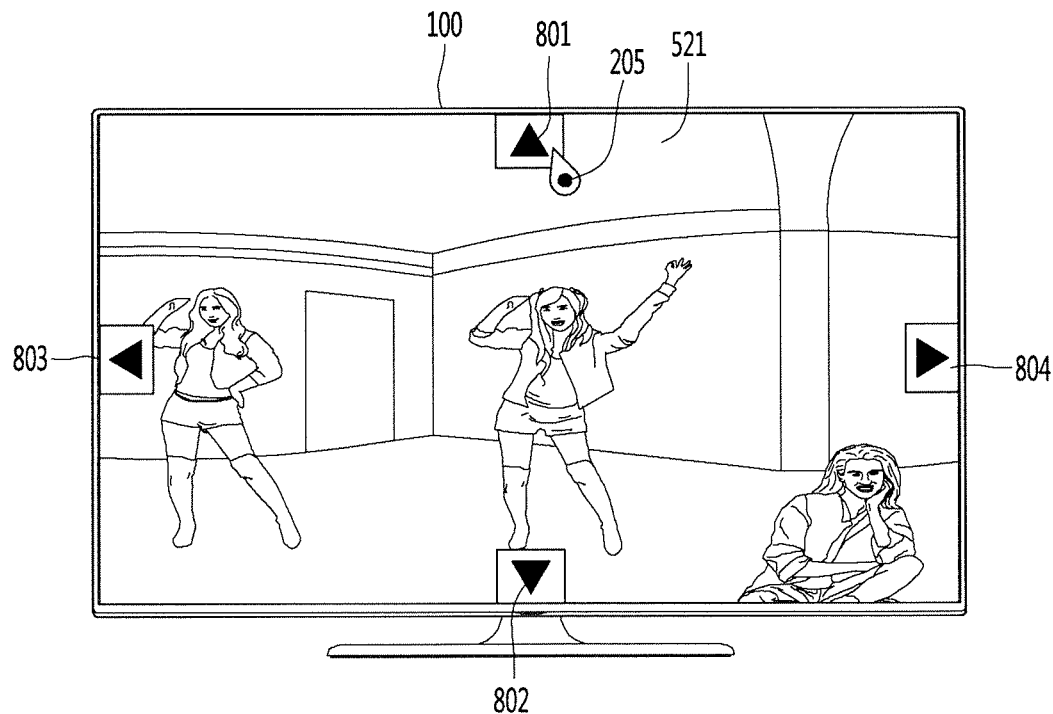
Figure 10C:
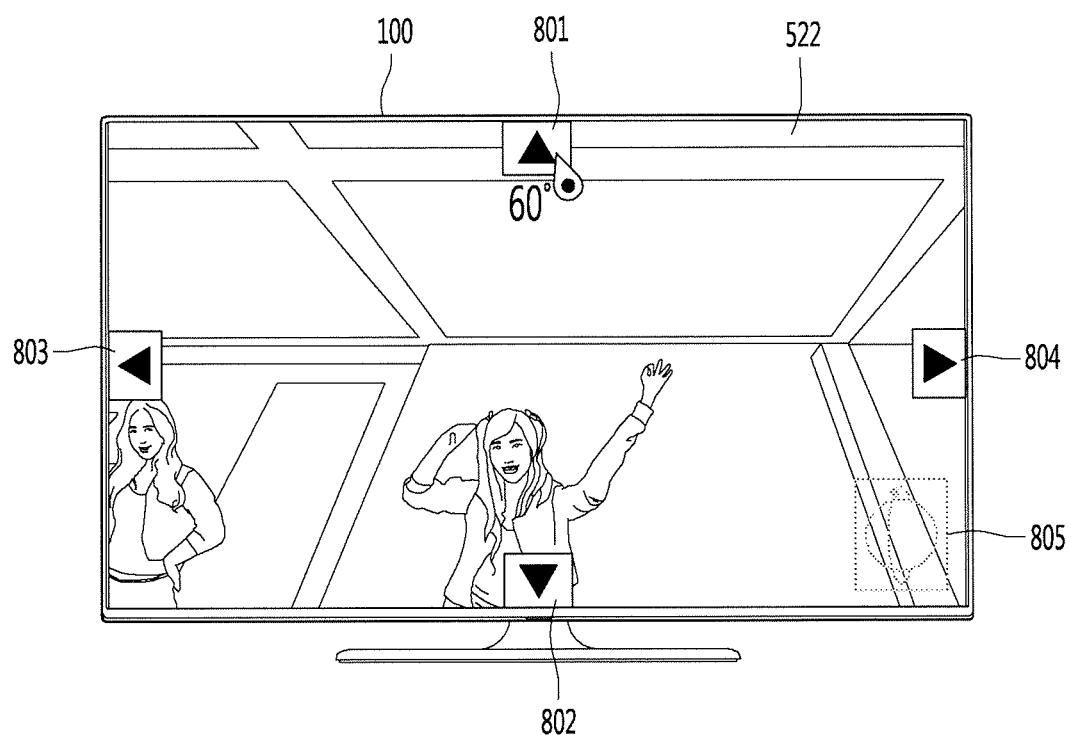

Next, FIGS. 10A to 10C are diagrams showing an example of an indicator for shifting the area of the partial image displayed according to the embodiment of FIGS. 9A to 9D. Referring to FIGS. 10A to 10C, as described with reference to FIG. 8A, the controller 170 can display one or more indicators 801 to 804 for shifting the area of the displayed partial image 521 of the omnidirectional image 500.

The user can select the indicator 801 using the remote control device 200 upon desiring to view the image of the upper area of the currently displayed partial image 521 of the omnidirectional image 500. In this instance, the controller 170 can display the partial image 522 corresponding to a view shifted from the view of the currently displayed partial image 521 upward by a predetermined degree (e.g., 60°) through the display unit 180.

According to the angle, the partial image 512 may or may not include a portion of the partial image 521 shown in FIG. 10A. The angle may be changed according to the set display mode. For convenience of description, assume that, in the first mode, the shift angles upon selecting the indicators 801 to 804 are identical (e.g., 45°).

As shown in FIGS. 8B and 8C, if the display mode of the omnidirectional image is a horizontal display mode, the image located at the left and right sides of the image in the first mode may be further included. Therefore, the shift angle (e.g., 60°) upon selecting the left or right indicator 803 or 804 may be greater than the shift angle (e.g., 45°) upon selecting the left or right indicator in the first mode. In other words, in the horizontal display mode, the shift angle (60°) upon selecting the left or right indicator 803 or 804 may be greater than the shift angle (45°) upon selecting the upper or lower indicator 801 or 802.

In contrast, as shown in FIGS. 10B and 10C, if the display mode of the omnidirectional image is a vertical display mode, the shift angle (e.g., 60°) upon selecting the upper or lower indicator 801 or 802 may be greater than the shift angle (e.g., 45°) upon selecting the upper or lower indicator 801 or 802 in the first mode. In other words, in the vertical display mode, the shift angle (e.g., 60°) upon selecting the upper or lower indicator 801 or 802 may be greater than the shift angle (e.g., 45°) upon selecting the left or right indicator 803 or 804.

Similarly to FIG. 8C, the controller 170 can display, adjacent to the upper indicator 801, an angle indicator 805 indicating that the view of the currently displayed partial image 522 is shifted from the reference view upward by 60°. That is, the user can intuitively confirm that the view of the currently displayed partial image 522 is shifted from the reference view upward by 60°. In some embodiments, the controller 170 can display a spherical indicator 806 indicating the location of the view of the currently displayed partial image 512 of the omnidirectional image 500.

According to the embodiments shown in FIGS. 5 to 10C, the display device 100 can provide the normal mode, the horizontal display mode, and the vertical display mode as the display mode of the omnidirectional image 500. The user can set the display mode to the horizontal display mode upon desiring to include the image of a wider area in the horizontal direction on one screen. In contrast, the user can set the display mode to the vertical display mode upon desiring to include the image of a wider area in the vertical direction on one screen. That is, the user can include the image of a wider area in a specific direction on one screen upon viewing the omnidirectional image, thereby more efficiently viewing the omnidirectional image.

Next, FIGS. 11A to 11D are diagrams showing examples of a partial image according to zoom-in and zoom-out operation for an omnidirectional image. In addition to the horizontal display mode and the vertical display mode described with reference to FIGS. 5 to 10C, the display device 100 can further provide a zoom mode as the display mode of the omnidirectional image.

Figure 11A:
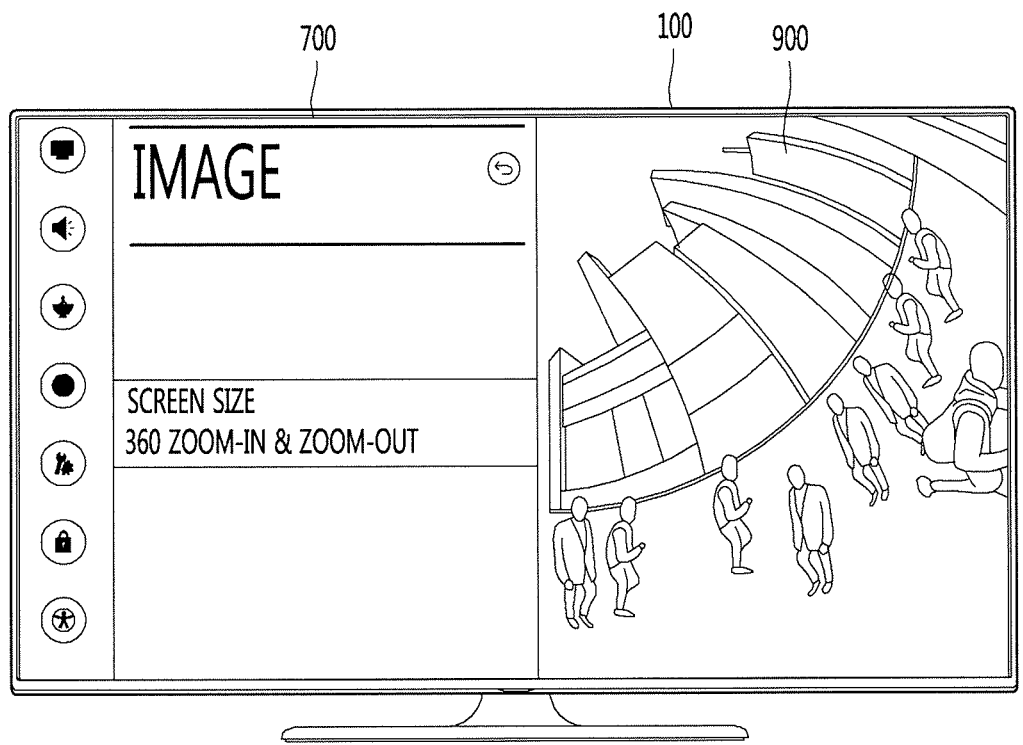
FIGS. 11A to 11D are diagrams showing examples of a partial image according to zoom-in and zoom-out operation for an omnidirectional image.

Referring to FIG. 11A, the controller 170 can receive input of setting the display mode to the zoom mode through the user input interface 150, based on the setting window 700. Based on the received input, the controller 170 can set the display mode of the omnidirectional image to the zoom mode. That is, "360 zoom-in & zoom-out" displayed in the setting window 700 of FIG. 11A may mean the zoom mode.

Figure 11B:
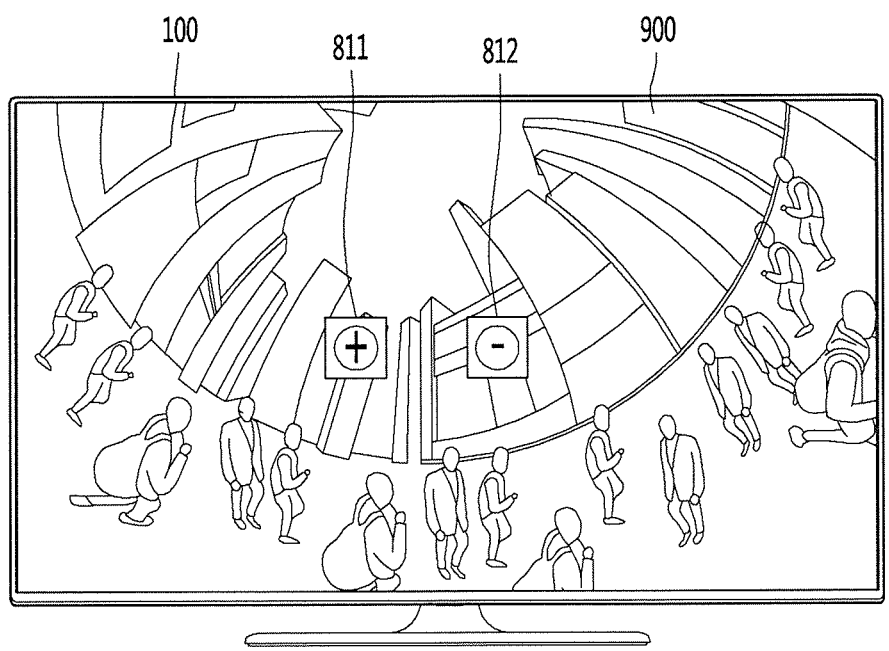

Referring to FIG. 11B, if the display mode of the omnidirectional image is set to the zoom mode, the controller 170 can display zoom-in and zoom-out indicators 812 and 812 for providing zoom functions to a displayed partial image 900. Although the zoom-in indicator 811 and the zoom-out indicator 812 are shown as being displayed in the central area of the display unit 180 in FIG. 11B, the locations of the indicators 811 and 812 may be variously changed. In addition, the controller 170 can further include indicators 801 to 804 shown in FIG. 8a.

Figure 11C:
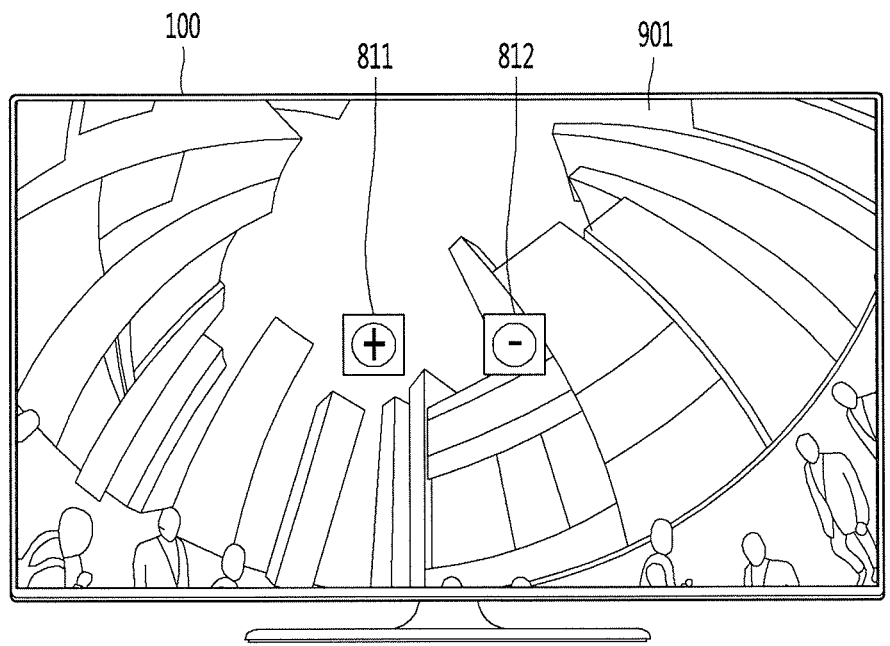

Referring to FIGS. 11B and 11C, when the zoom-in indicator 811 displayed through the display unit 180 is selected, the controller 170 can display the zoomed-in image 901 of the partial image 900 through the display unit 180. That is, the user can view the zoomed-in image using the zoom-in indicator 811, upon desiring to zoom in the image of a specific area.

Figure 11D:
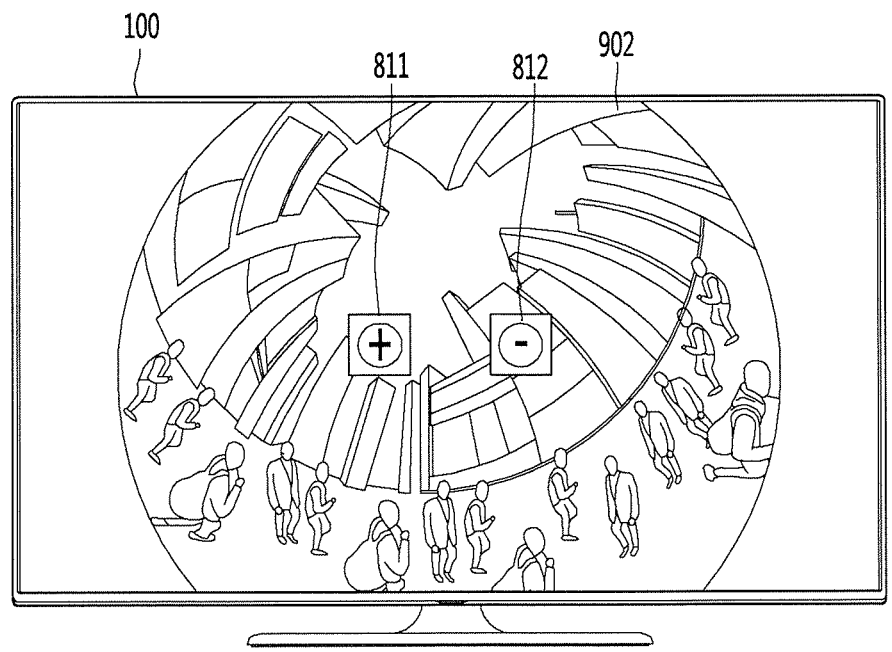

In addition, referring to FIGS. 11B and 11D, when the zoom-out indicator 812 displayed through the display unit 180 is selected, the controller 170 can display the zoomed-out image 902 of the partial image 900 through the display unit 180. In the omnidirectional image, the zoomed-out image of the partial image 900 of a specific view may include a semi-spherical area of the view. That is, the user can view an image 902 including the semi-spherical area of the specific view through the display unit 180, thereby viewing an image of a wider area on one screen.

Hereinafter, various embodiments related to operation for providing an omnidirectional image in the form of a thumbnail image at a display device according to an embodiment of the present invention will be described. In particular, FIG. 12 is a block diagram illustrating operation of components related to thumbnail image extraction of a display device according to an embodiment of the present invention.

Figure 12:
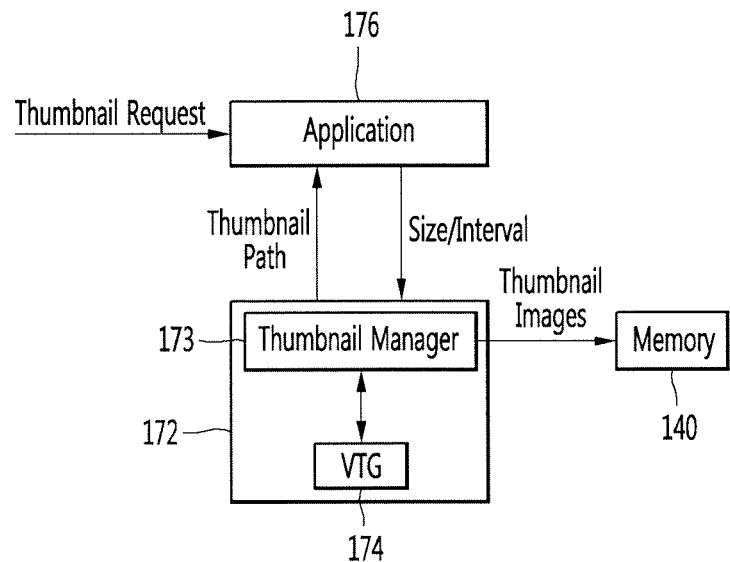
FIG. 12 is a block diagram illustrating operation of components related to thumbnail image extraction of a display device according to an embodiment of the present invention.

Referring to FIG. 12, the display device 100 can include a thumbnail management module 172 for generating and transmitting thumbnail images of an omnidirectional image. The thumbnail management module 172 may be implemented by software executed by the controller 170 or a combination of hardware and software. The thumbnail management module 172 may include a thumbnail manager 173 and a video timing generator (VTG) 174.

Operation for generating a plurality of thumbnail images from the omnidirectional image at the display device 100 based on the components shown in FIG. 12 will be described. The controller 170 can execute an application 176 for outputting the omnidirectional image. A request for providing the thumbnail images of the omnidirectional image may be received through the executed application 176. The application 176 may transmit information on the size of the thumbnail image and information on a thumbnail image generation time interval to the thumbnail management module 172 based on the received request.

The thumbnail manager 173 included in the thumbnail management module 172 may generate a plurality of thumbnail images from the omnidirectional image based on the information on the size of the thumbnail image and the information on the thumbnail image generation time interval. More specifically, the thumbnail manager 173 may extract a plurality of thumbnail images from the omnidirectional image at a specific playback time of the omnidirectional image, using the VTG 174 and the interval information. The thumbnail manager 173 may store the extracted thumbnail images in the memory 140 and transmit information on a storage route of the stored thumbnail images to the application 176. The application 176 may display the plurality of thumbnail images through the display unit 180 based on the information on the storage route.

Hereinafter, an embodiment in which the display device 100 provides the omnidirectional image using the thumbnail images of the omnidirectional image will be described with reference to FIGS. 13A to 15C. In particular, FIGS. 13A to 13C are diagrams illustrating an omnidirectional image display method of a display device when a view mode of an omnidirectional image is set to a horizontal view mode.

Figure 13A:
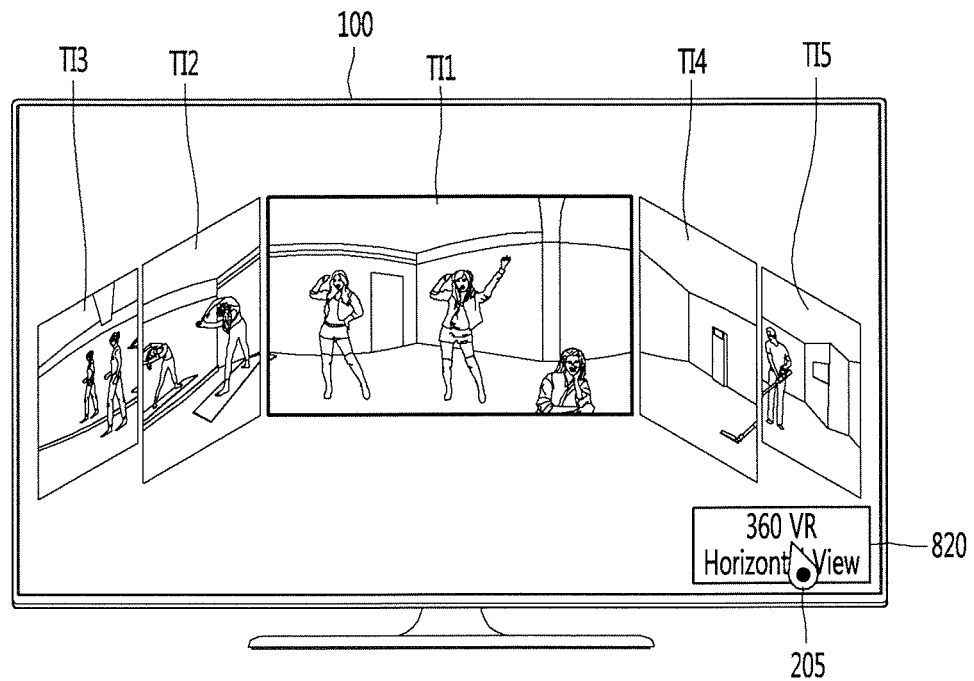
FIGS. 13A to 13C are diagrams illustrating an omnidirectional image display method of a display device when a view mode of an omnidirectional image is set to a horizontal view mode.
Figure 13B:
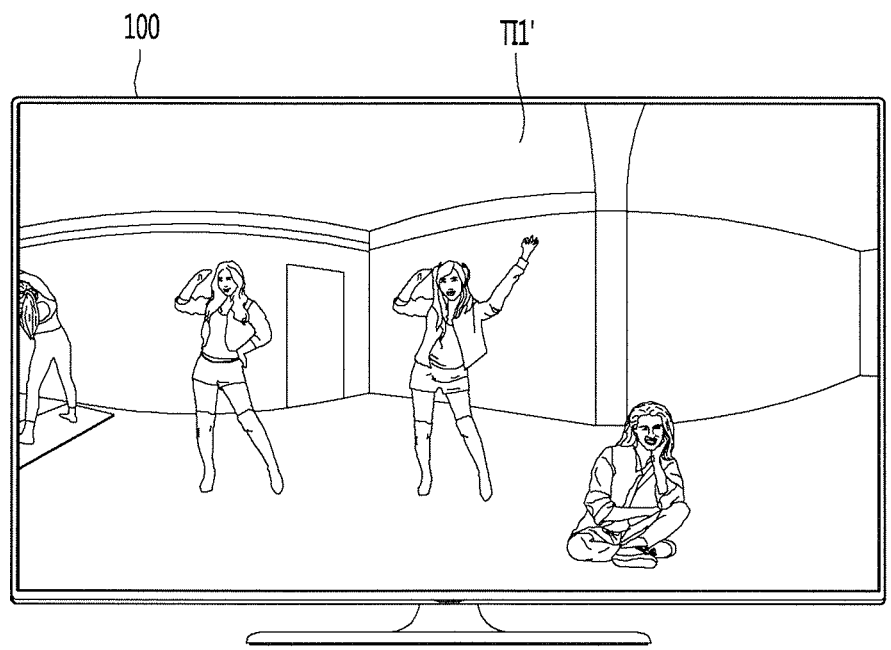
Figure 13C:
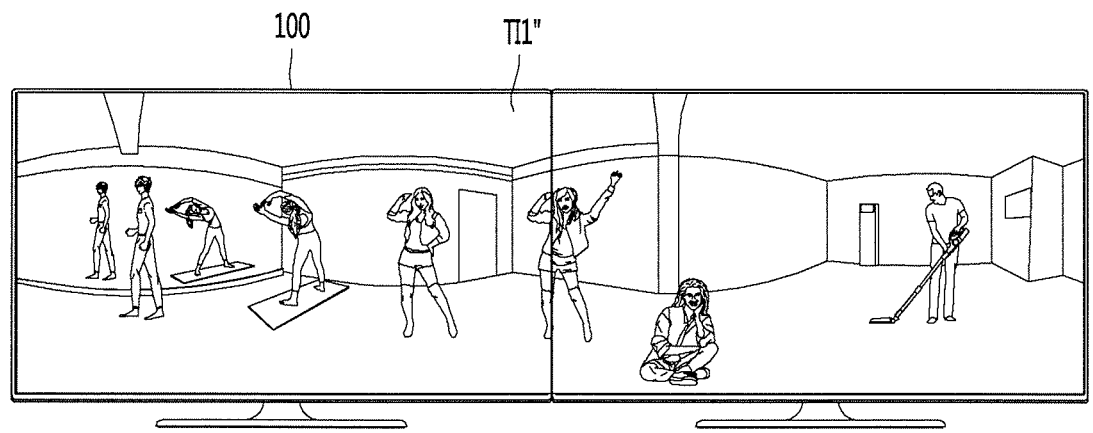

Referring to FIG. 13A, the controller 170 can set the view mode of the omnidirectional image. The view mode may include a horizontal view mode, a vertical view mode and a normal view mode. For example, the controller 170 can receive input of setting any one of the horizontal view mode, the vertical view mode and the normal view mode as the view mode of the omnidirectional image through the remote control device 200. In order to receive the input, the controller 170 can display a view mode setting window 820 through the display unit 180. Based on the received input, the view mode of the omnidirectional image is set.

The controller 170 can display a plurality of thumbnail images of the omnidirectional image according to the set view mode, upon receiving a request for displaying the thumbnail images of the omnidirectional image. As shown in FIG. 13A, if the view mode is set to a horizontal view mode, the controller 170 can display a plurality of thumbnail images TI1 to TI5 of the omnidirectional image at a specific playback time (e.g., a first playback time) through the display unit 180. At this time, the plurality of thumbnail images TI1 to TI5 may include thumbnail images TI2 to TI5 located in the horizontal direction (at the left or right side) of the reference thumbnail image TI1. In addition, the thumbnail images TI1 to TI5 may be changed to thumbnail images at a second playback time after lapse of a predetermined time.

The controller 170 can receive a request for selecting any one of the plurality of displayed thumbnail images TI1 to TI5. For example, the controller 170 can display a pointer 205 on one of the plurality of thumbnail images TI1 to TI5 based on motion information received from the remote control device 200. When selection input is received from the remote control device 200, the controller 170 can select the thumbnail image, on which the pointer 205 is located.

Referring to FIG. 13B, if the selected thumbnail image is a first thumbnail image TI1, the controller 170 can display a partial image TI1' including an area corresponding to the first thumbnail image TI1 of the omnidirectional image and an additional area extending from the area in the horizontal direction, through the display unit 180. That is, the partial image TI1' may include the third thumbnail image TI1, a portion of the second thumbnail image TI2 and a portion of the fourth thumbnail image TI4.

Referring to FIG. 13C, in some embodiments, the display device 100 can include a first display device and a second display device and may be implemented such that one side of the first display device and one side of the second display device are adjacent to each other (hereinafter, referred to as twin mode).

The controller 170 can display a partial image TI1" including the selected first thumbnail image TI1 and all the images located in the horizontal direction of the first thumbnail image, when the display device 100 is implemented in the twin mode. That is, the partial image TI1" of the omnidirectional image may include the first thumbnail image TI1 to the fifth thumbnail image TI5.

Figure 14A:
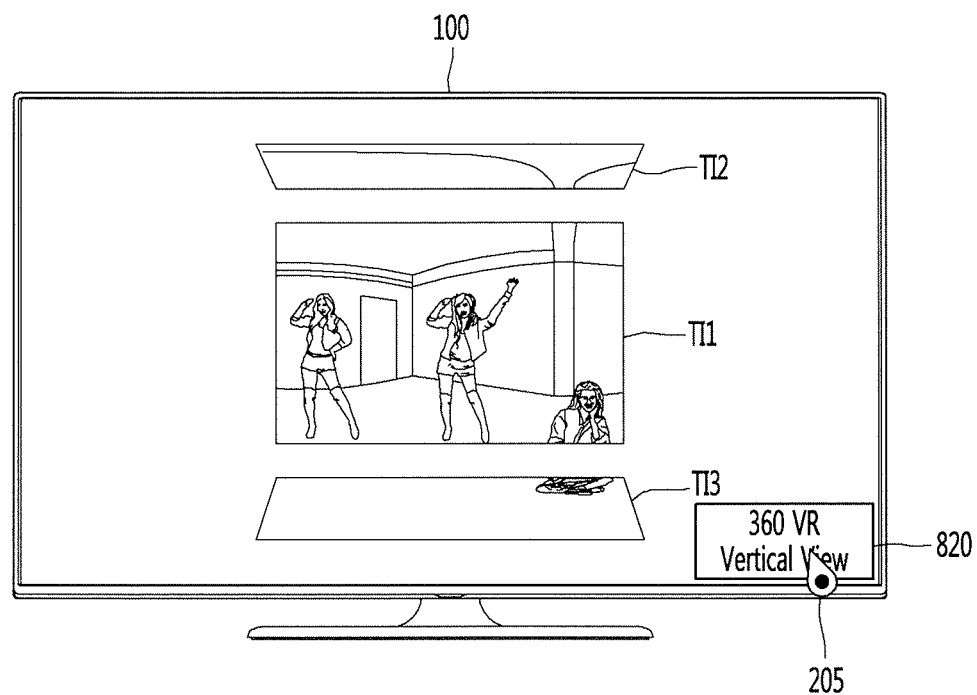
FIGS. 14A to 14C are diagrams illustrating an omnidirectional image display method of a display device when a view mode of an omnidirectional image is set to a vertical view mode.
Figure 14B:
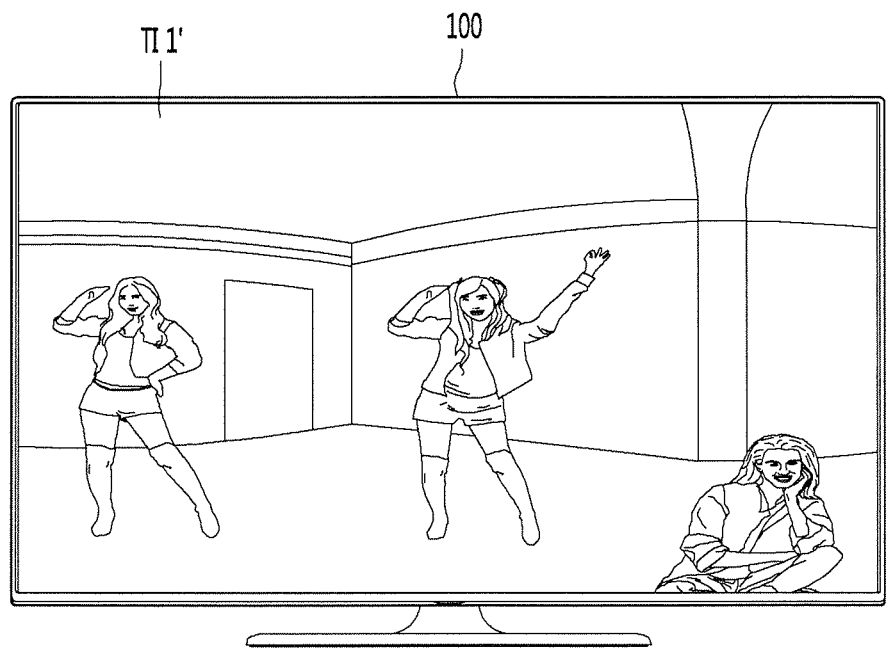
Figure 14C:
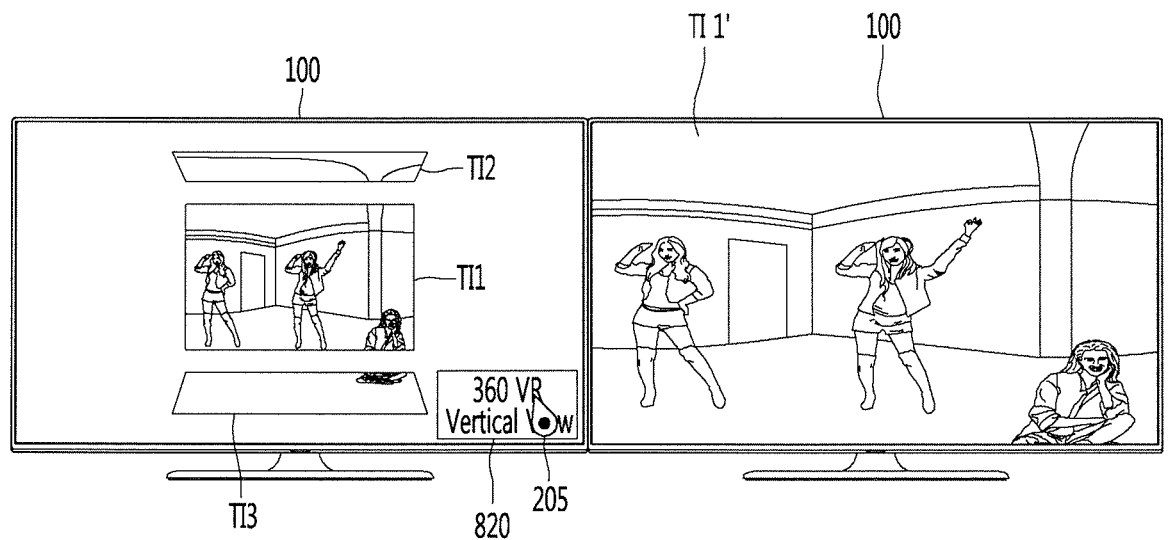

FIGS. 14A to 14C are diagrams illustrating an omnidirectional image display method of a display device when a view mode of an omnidirectional image is set to a vertical view mode. Referring to FIG. 14a, the controller 170 can receive a request for displaying the thumbnail images of the omnidirectional image and receive a request for setting the view mode of the omnidirectional image to the vertical view mode through the view mode setting window 820. In response to the received request, the controller 170 can display a plurality of thumbnail images TI1 to TI3 of the omnidirectional image at a first playback time through the display unit 180. At this time, the plurality of displayed thumbnail images TI1 to TI3 may include thumbnail images TI2 and TI3 located in the vertical direction (at the upper or lower side) of the reference thumbnail image TI1. In addition, the thumbnail images TI1 to TI3 may be changed to thumbnail images of a second playback time after lapse of a predetermined time. The controller 170 can receive a request for selecting any one of the plurality of displayed thumbnail images TI1 to TI3.

Referring to FIG. 14B, if the selected thumbnail image is the first thumbnail image TI1, the controller 170 can display a partial image TI1' including an area corresponding to the first thumbnail image TI1 of the omnidirectional image and including an additional area extending from the area in the vertical direction. That is, the partial image TI1' may include the first thumbnail image TI1, a portion of the second thumbnail image TI2 and a portion of the third thumbnail image TI3.

Referring to FIG. 14C, if the display device 100 is implemented in a twin mode, the controller 170 can display the thumbnail images TI1 to TI3 through the first display device and display the partial image TI1' including the selected first thumbnail image TI1 through the second display device. If a thumbnail image (e.g., the second thumbnail image TI2) other than the first thumbnail image TI1 among the thumbnail images TI1 to TI3 displayed through the first display device is selected, the controller 170 can display the second thumbnail image TI2 and a partial image including an additional area extending from the area of the second thumbnail image TI2, instead of the partial image TI1' displayed through the second display device.

Figure 15A:
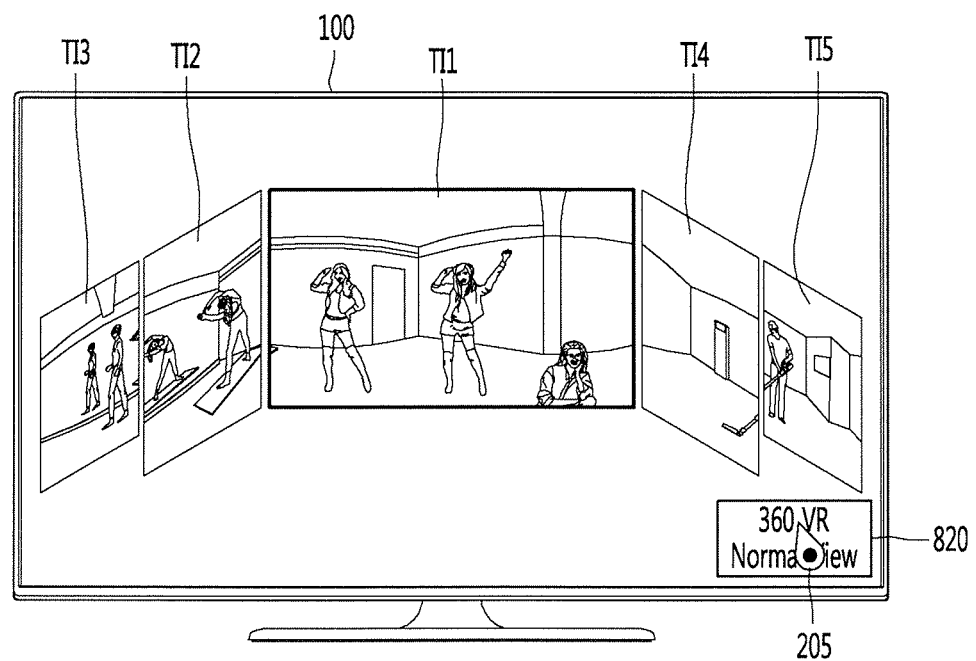
FIGS. 15A to 15C are diagrams illustrating an omnidirectional image display method of a display device when a view mode of an omnidirectional image is set to a normal view mode.
Figure 15B:
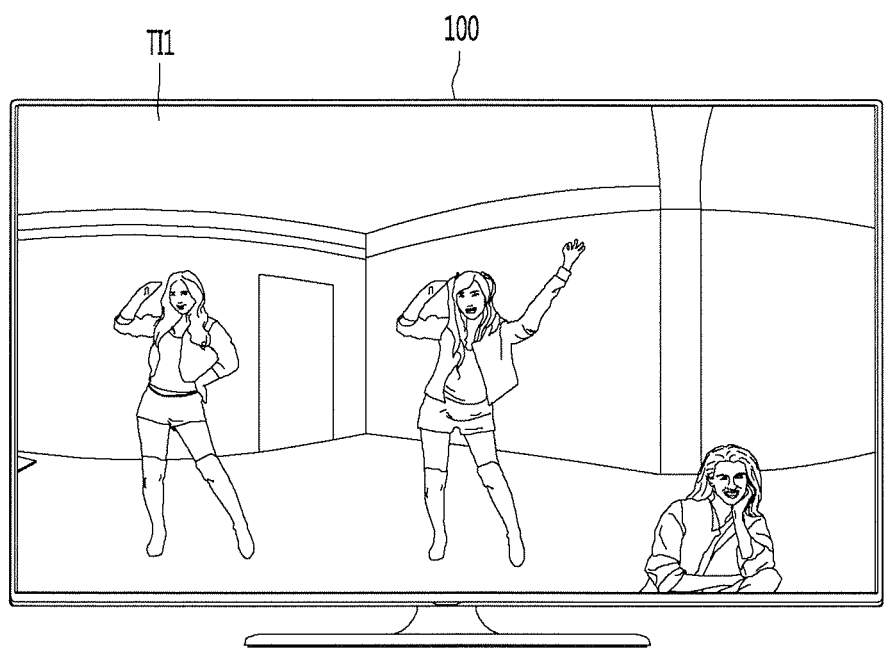
Figure 15C:
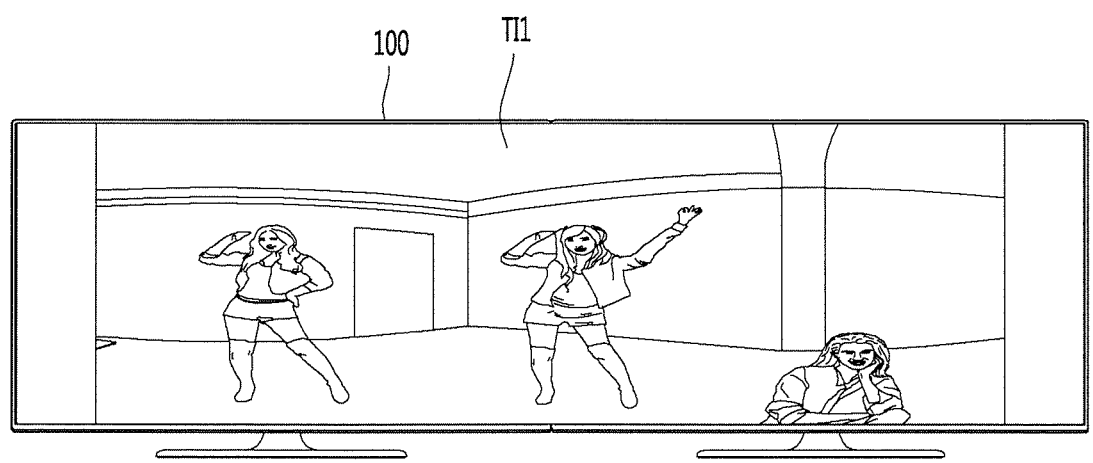

FIGS. 15A to 15C are diagrams illustrating an omnidirectional image display method of a display device when a view mode of an omnidirectional image is set to a normal view mode. Referring to FIG. 15A, the controller 170 can receive a request for displaying the thumbnail images of the omnidirectional image and receive a request for setting the view mode of the omnidirectional image to the normal view mode through the view mode setting window 820. In response to the received request, the controller 170 can display a plurality of thumbnail images TI1 to TI5 of the omnidirectional image at a first playback time through the display unit 180.

In FIG. 15A, the plurality of thumbnail images TI2 to TI5 displayed through the display unit 180 is the thumbnail images located in the horizontal direction (at the left or right side) of the reference thumbnail image TI1. However, in some embodiments, the thumbnail images TI2 to TI5 may be thumbnail images located in the vertical direction (at the upper or lower side) of the reference thumbnail image TH. The controller 170 can receive a request for selecting any one of the plurality of displayed thumbnail images TI1 to TI5.

Referring to FIG. 15B, if the selected thumbnail image is the first thumbnail image TI1, the controller 170 can display the partial image TI1 corresponding to the area of the first thumbnail image TI1 through the display unit 180. That is, in the normal view mode, the controller 170 can display only the selected thumbnail image through the display unit 180.

Referring to FIG. 15C, if the display device 100 is implemented in the twin mode, the controller 170 can display the partial image TI1 through the first display device and the second display device. In some embodiments, as shown in FIG. 14C, the thumbnail images TI1 to TI5 may be displayed through the first display device and the partial image TI1 corresponding to the selected first thumbnail image may be displayed through the second display device.

That is, according to the embodiments shown in FIGS. 13A to 15C, the user can select a partial image to be displayed from the omnidirectional image based on the thumbnail images of the areas configuring the omnidirectional image. In addition, a partial image further including an area other than the selected area is displayed on one screen according to the view mode, such that the user can select an optimal view mode to efficiently view image.

Hereinafter, another embodiment in which the display device 100 provides the omnidirectional image using the thumbnail images of the omnidirectional image will be described with reference to FIGS. 16A to 18B. In particular, FIGS. 16A and 16B are diagrams illustrating an omnidirectional image display method of a display device when a view mode of an omnidirectional image is set to a horizontal panorama mode.

Figure 16A:
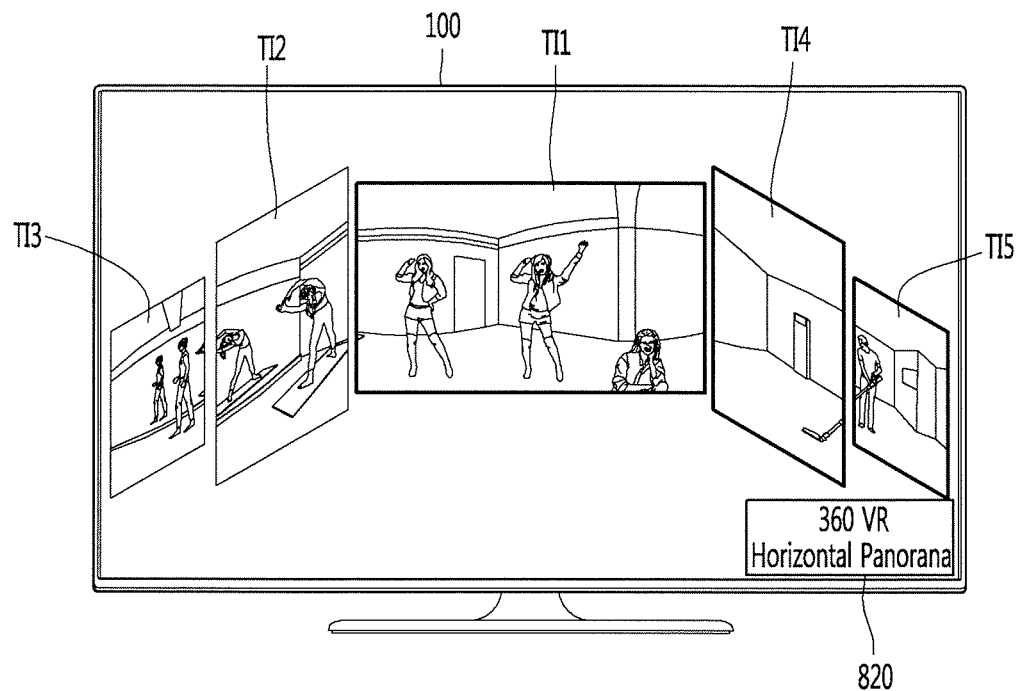
FIGS. 16A and 16B are diagrams illustrating an omnidirectional image display method of a display device when a view mode of an omnidirectional image is set to a horizontal panorama mode.

Referring to FIG. 16A, the controller 170 can receive a request for displaying the thumbnail images of the omnidirectional image and receive a request for setting the view mode of the omnidirectional image to a horizontal panorama mode through the view mode setting window 820. In response to the received request, the controller 170 can display a plurality of thumbnail images TI1 to TI5 of the omnidirectional image at a first playback time through the display unit 180. At this time, the plurality of displayed thumbnail images TI1 to TI5 may include the thumbnail images TI2 to TI5 located in the horizontal direction (at the left or right side) of the reference thumbnail image TI1. In addition, the thumbnail images TI1 to TI5 may be changed to the thumbnail images at a second playback time after lapse of a predetermined time.

The controller 170 can receive a request for selecting at least one of the plurality of displayed thumbnail images TI1 to TI5. For example, the controller 170 can receive a request for selecting the first thumbnail image TI1, the fourth thumbnail image TI4 and the fifth thumbnail image TI5 from among the plurality of thumbnail images TI1 to TI5.

Figure 16B:
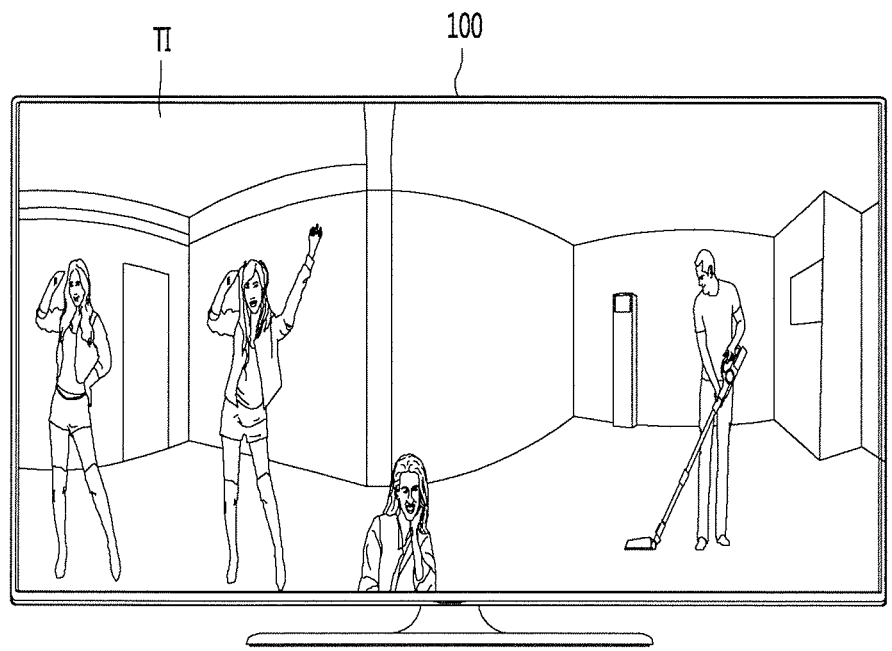

Referring to FIG. 16B, the controller 170 can display a partial image TI including the first thumbnail image TI1, the fourth thumbnail image TI4 and the fifth thumbnail image TI5 selected in FIG. 16A through the display unit 180. That is, the partial image TI may correspond to a partial image of an area including at least one selected from the plurality of thumbnail images.

Figure 17A:
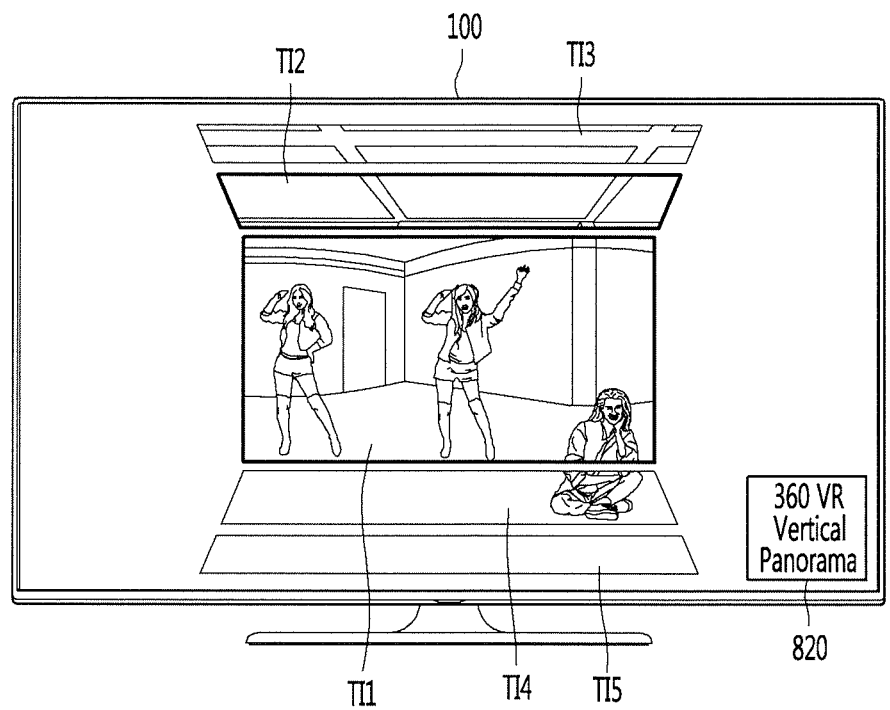
FIGS. 17A and 17B are diagrams illustrating an omnidirectional image display method of a display device when a view mode of an omnidirectional image is set to a vertical panorama mode.
Figure 17B:
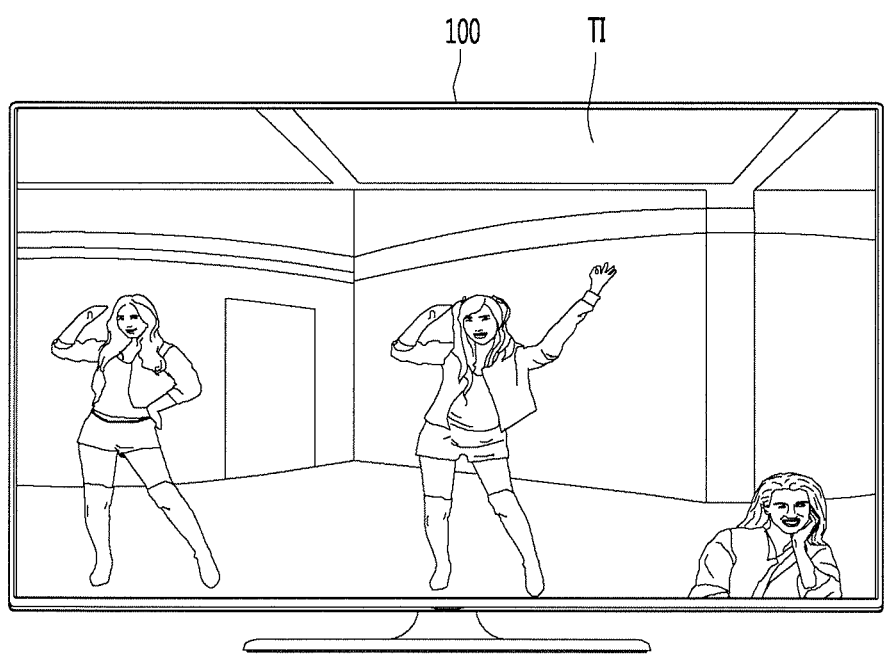

FIGS. 17A and 17B are diagrams illustrating an omnidirectional image display method of a display device when a view mode of an omnidirectional image is set to a vertical panorama mode. Referring to FIG. 17A, the controller 170 can receive a request for displaying the thumbnail images of the omnidirectional image and receive a request for setting the view mode of the omnidirectional image to a vertical panorama mode through the view mode setting window 820. In response to the received request, the controller 170 can display a plurality of thumbnail images TI1 to TI5 of the omnidirectional image at a first playback time through the display unit 180. At this time, the plurality of displayed thumbnail images TI1 to TI5 may include the thumbnail images TI2 to TI5 located in the vertical direction (at the upper or lower side) of the reference thumbnail image TI1. In addition, the thumbnail images TI1 to TI5 may be changed to the thumbnail images at a second playback time after lapse of a predetermined time.

The controller 170 can receive a request for selecting at least one of the plurality of displayed thumbnail images TI1 to TI5. For example, the controller 170 can receive a request for selecting the first thumbnail image TI1 and the second thumbnail image TI2 from among the plurality of thumbnail images TI1 to TI5.

Referring to FIG. 17B, the controller 170 can display a partial image TI including the first thumbnail image TI1 and the second thumbnail image TI2 selected in FIG. 17A through the display unit 180. That is, the partial image TI may correspond to a partial image of an area including at least one selected from the plurality of thumbnail images.

Figure 18A:
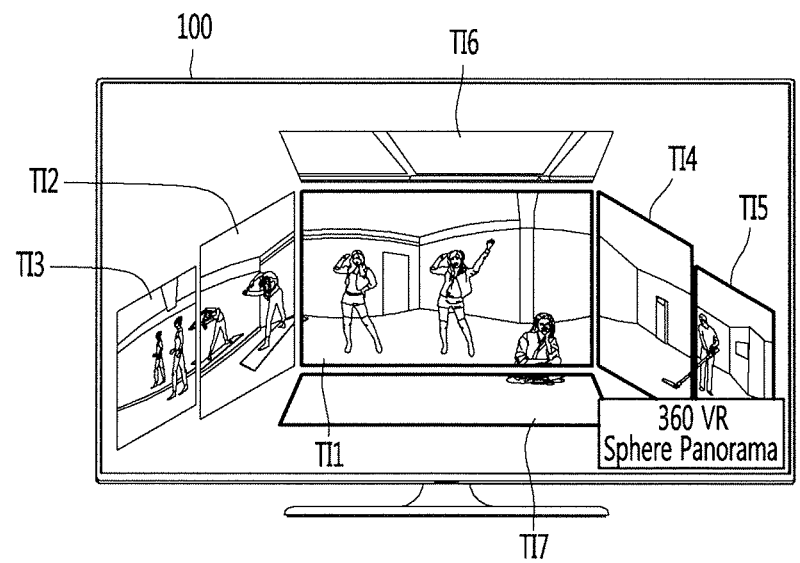
FIGS. 18A and 18B are diagrams illustrating an omnidirectional image display method of a display device when a view mode of the omnidirectional image is set to a spherical panorama mode.
Figure 18B:
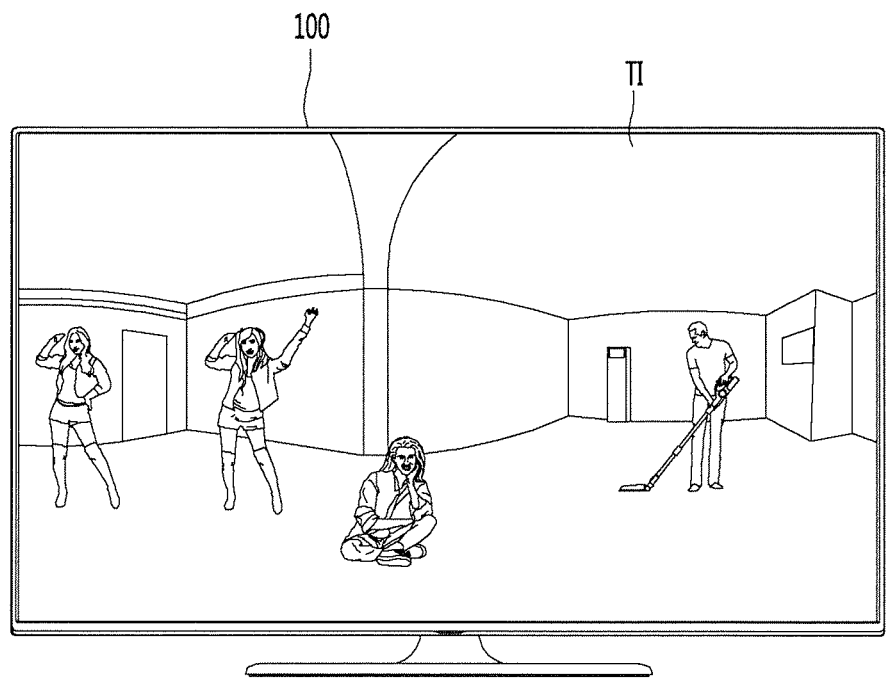

FIGS. 18A and 18B are diagrams illustrating an omnidirectional image display method of a display device when a view mode of the omnidirectional image is set to a spherical panorama mode. Referring to FIG. 18A, the controller 170 can receive a request for displaying the thumbnail images of the omnidirectional image and receive a request for setting the view mode of the omnidirectional image to a spherical panorama mode through the view mode setting window 820. In response to the received request, the controller 170 can display a plurality of thumbnail images TI1 to TI7 of the omnidirectional image at a first playback time through the display unit 180. At this time, the plurality of displayed thumbnail images TI1 to TI5 may include the thumbnail images TI2 to TI5 located in the horizontal direction (at the left or right side) of the reference thumbnail image TI1 and the thumbnail images TI6 and TI7 located in the vertical area (at the upper or lower side) of the reference thumbnail image TI1. In addition, the thumbnail images TI1 to TI7 may be changed to the thumbnail images at a second playback time after lapse of a predetermined time.

The controller 170 can receive a request for selecting at least one of the plurality of displayed thumbnail images TI1 to TI7. For example, the controller 170 can receive a request for selecting the first thumbnail image TI1, the fourth thumbnail image TI4, the fifth thumbnail image TI5 and the seventh thumbnail image TI7 from among the plurality of thumbnail images TI1 to TI7.

Referring to FIG. 18B, the controller 170 can display a partial image TI including the first thumbnail image TI1, the fourth thumbnail image TI4, the fifth thumbnail image TI5 and the seventh thumbnail image TI7 selected in FIG. 18B through the display unit 180. That is, the partial image TI may correspond to a partial image of an area including at least one selected from among the plurality of thumbnail images.

That is, according to the embodiments shown in FIGS. 16A to 18B, the user can select the thumbnail images corresponding to the areas to be viewed on one screen based on the thumbnail images of the omnidirectional image displayed through the display unit.

According to one embodiment of the present invention, the display device can change the size of the area based on the display mode set with respect to the omnidirectional image when a partial image including a portion of the omnidirectional image is displayed through the display unit. Therefore, the user can view a wider area in the horizontal or vertical direction on one screen by setting the display mode, thereby more efficiently viewing the omnidirectional image.

In addition, the display device according to the embodiment of the present invention can provide an indicator for shifting the view of the displayed area of an omnidirectional image and provide an angle indicator for displaying the shift angle from a reference view. Based on the provided indicators, the user can freely shift the area of the partial image displayed through the display unit and intuitively confirm the angle information of the view shifted from the reference view.

The display device can also change the shift angle upon shifting the view using the indicator according to the set display mode, thereby providing a more convenient omnidirectional image viewing environment to the user.

According to one embodiment of the present invention, the above-described method may be implemented as code that can be written to a processor-readable recording medium and can thus be read by a processor. Examples of the processor-readable recording medium include a ROM, a RAM, a CD-ROM, a magnetic tape, a floppy disk, optical data storage, and a carrier wave (e.g., data transmission over the Internet).

The present invention is not limited to the configurations and the methods of the above-described embodiments and some or all of the above-described embodiments may be combined to be variously modified.

What is claimed is:
1. A display device comprising:
a display configured to display at least a portion of an omnidirectional image;
a user input interface configured to input a display mode of the omnidirectional image to be one of a first display mode and a second display mode; and a controller configured to:
in response to the input display mode being the first display mode, set a size of an area of the omnidirectional image to be displayed on the entire area of the display to correspond with an aspect ratio of the display,
in response to the input display mode being the second display mode, set the size of the area of the omnidirectional image to be displayed on the entire area of the display to have a size which does not correspond to the aspect ratio of the display,
acquire a first partial image having an area having the size corresponding to the set aspect ratio from the omnidirectional image, and
display the first partial image on the entire area of the display including the area having the set size of the omnidirectional image.

2. The display device according to claim 1, wherein the second mode includes:
a horizontal display mode for displaying a partial image further including an additional area located in a horizontal direction of an area of a partial image displayed according to the first mode, and
a vertical display mode for displaying a partial image further including an additional area located in a vertical direction of the area of the partial image displayed according to the first mode.

3. The display device according to claim 2, wherein the display mode is set based on setting of the aspect ratio of the display device, and
wherein the controller is further configured to:
set the display mode to the first mode if the set aspect ratio is equal to the aspect ratio of the display,
set the display mode to the horizontal display mode if the width of the set aspect ratio is greater than that of the aspect ratio of the display, and
set the display mode to the vertical display mode if the height of the set aspect ratio is greater than that of the aspect ratio of the display.

4. The display device according to claim 2, wherein the controller is further configured to:
display the first partial image in an entire area of the display if the display mode is set to the second mode.

5. The display device according to claim 1, wherein the controller is further configured to:
display an indicator for shifting the view of the displayed first partial image of the omnidirectional image,
receive input of selecting the displayed indicator, and
display a second partial image including an area of a view shifted based on the received input.

6. The display device according to claim 5, wherein the controller is further configured to:
display the second partial image on the display including the area of the view shifted from the view of the first partial image by a predetermined angle based on the input of selecting the indicator, and
change the shift angle of the view according to the set display mode.

7. The display device according to claim 6, wherein the controller is further configured to:
display an angle indicator indicating an angle between a reference view of the omnidirectional image and a view of the second partial image.

8. The display device according to claim 5, wherein the controller is further configured to:
display a reference view indicator for shifting the view of the second partial image to a reference view, and
display a third partial image on the display including the area of the reference view when the reference view indicator is selected.

9. The display device according to claim 1, wherein the display mode further includes a zoom mode, and if the display mode is set to the zoom mode, the controller is further configured to:
display a zoom-in indicator for providing a zoomed-in image of the first partial image of the omnidirectional image and a zoom-out indicator for providing a zoomed-out image of the first partial image of the omnidirectional image.

10. A display device comprising:
a display; and
a controller configured to:
set a display mode of an omnidirectional image based on a set aspect ratio of the display,
set a size of an area corresponding to a first view and a second view of the omnidirectional image to be displayed on the entire area of the display based on the set display mode,
acquire a first partial image and a second partial image having an area having a size corresponding to the set aspect ratio from the omnidirectional image,
display the first partial image on the entire area of the display including the area having the set size, and
display the second partial image including the area having the set size respectively based on an input from a user interface.

11. The display device according to claim 10, wherein the set size corresponds to the set aspect ratio of the display.

12. The display device according to claim 10, wherein the controller is further configured to:
set the display mode to a normal mode if the set aspect ratio is equal to an aspect ratio of the display,
set the display mode to a horizontal display mode if the width of the set aspect ratio is greater than that of the aspect ratio of the display, and
set the display mode to a vertical display mode if the length of the set aspect ratio is greater than that of the aspect ratio of the display.

13. The display device according to claim 12, wherein the controller is further configured to:
display an indicator for shifting the first view to a second view, and
change the first partial image to a second partial image including the area of the second view based on input of selecting the displayed indicator.

14. The display device according to claim 13, wherein the indicator includes a first indicator for shifting the first view in a horizontal direction and a second indicator for shifting the first view in a vertical direction.

15. The display device according to claim 14, wherein the controller is further configured to:
display the second partial image on the display including the area of the second view shifted from the first view by a first angle in a horizontal direction, when the first indicator is selected, and
display the second partial image on the display including the area of the second view shifted from the first view by a second angle in a vertical direction, when the second indicator is selected.

16. The display device according to claim 15, wherein, if the display mode is the normal mode, the first angle and the second angle are equal.

17. The display device according to claim 15, wherein the first angle is greater than the second angle if the display mode is the horizontal display mode.

18. The display device according to claim 15, wherein the first angle is less than the second angle if the display mode is the vertical display mode.

19. The display device according to claim 10, wherein the display mode further includes a zoom mode, and if the display mode is set to the zoom mode, the controller is further configured to:

display a zoom-in indicator for providing a zoomed-in image of the first partial image of the omnidirectional image and a zoom-out indicator for providing a zoomed-out image of the first partial image of the omnidirectional image.

\* \* \* \* \*